US012655582B2

(12) United States Patent
Cho et al.

(10) Patent No.: US 12,655,582 B2
(45) Date of Patent: *Jun. 16, 2026

(54) HYGROMORPHIC COMPOSITE MATERIAL

(71) Applicant: Nanyang Technological University, Singapore (SG)

(72) Inventors: Nam-Joon Cho, Singapore (SG); Ze Zhao, Singapore (SG); Subra Suresh, Singapore (SG)

(73) Assignee: Nanyang Technological University, Singapore (SG)

( * ) Notice: Subject to any disclaimer, the term of this patent is extended or adjusted under 35 U.S.C. 154(b) by 190 days.

This patent is subject to a terminal disclaimer.

(21) Appl. No.: 18/280,842

(22) PCT Filed: Mar. 16, 2022

(86) PCT No.: PCT/SG2022/050140
§ 371 (c)(1),
(2) Date: Sep. 7, 2023

(87) PCT Pub. No.: WO2022/197247
PCT Pub. Date: Sep. 22, 2022

(65) Prior Publication Data
US 2024/0150959 A1 May 9, 2024

(30) Foreign Application Priority Data

Mar. 16, 2021 (SG) ............................. 10202102664T
Sep. 20, 2021 (SG) ............................. 10202110353Y

(51) Int. Cl.
*D21H 17/21* (2006.01)
*B41J 3/407* (2006.01)
(Continued)

(52) U.S. Cl.
CPC ................ *D21B 1/02* (2013.01); *B41J 3/407* (2013.01); *B41M 1/26* (2013.01); *D21C 5/027* (2013.01);
(Continued)

(58) Field of Classification Search
CPC .......... D21H 17/21; D21H 27/00; B41M 1/26
See application file for complete search history.

(56) References Cited

U.S. PATENT DOCUMENTS

2017/0146445 A1 5/2017 Mahadevan et al.
2018/0092852 A1* 4/2018 Gill ...................... A61K 9/4816

FOREIGN PATENT DOCUMENTS

WO WO-2019147190 A1 * 8/2019 ............... A61K 9/19

OTHER PUBLICATIONS

Zhao. Z. et al., Digital printing of shape-morphing natural materials. PNAS, Oct. 18, 2021, vol. 118, No. 43, pp. 2113715118 1-1 O [Retrieved on May 25, 2022] <DOI: 10.1073/PNAS.2113715118> Whole document see especially p. 9, pollen paper fabrication, figures 2E-2G, 3B, 3C, SA, 6B, 7, S1, tables S1-S3.
(Continued)

*Primary Examiner* — Anthony Calandra
(74) *Attorney, Agent, or Firm* — Patterson + Sheridan, LLP

(57) ABSTRACT

Disclosed herein is a hygromorphic composite material comprising a moisture-active pollen paper substrate formed from a plurality of pollen microgel particles, and at least one moisture-inactive layer applied onto the top and/or bottom surface of the moisture-active pollen paper substrate with a pattern that causes the hygromorphic composite material to change its shape in a pre-determined manner due to a change in relative humidity of its ambient environment. Also disclosed herein is a method of forming the hygromorphic composite material.

15 Claims, 18 Drawing Sheets

(51) Int. Cl.

*B41M 1/26*          (2006.01)
    *D21B 1/02*           (2006.01)
    *D21C 5/02*           (2006.01)
    *D21H 25/02*         (2006.01)
    *G01L 1/22*           (2006.01)

(52) U.S. Cl.

CPC .............. *D21H 17/21* (2013.01); *D21H 25/02* (2013.01); *G01L 1/2287* (2013.01)

(56) References Cited

OTHER PUBLICATIONS

Zhao, Z. et al., Actuation and locomotion driven by moisture in paper made with natural pollen. PNAS, Apr. 6, 2020, vol. 117, No. 16, pp. 8711-8718 [Retrieved on May 25, 2022] <DOI: 10.1073/PNAS.1922560117> Whole document.

Ma, J-N et al., Programmable deformation of patterned bimorph actuator swarm. National Science Review, Apr. 4, 2020, vol. 7, No. 4, pp. 775-785 [Retrieved on May 25, 2022] <DOI: 10.1093/NSR/NWZ219> Whole document.

International Search Report and Written Opinion in related application PCT/SG2022/050140 dated May 25, 2022.

Zhao et al.; A 3D micromechanical study of hygroscopic coiling deformation in Pelargonium seed: from material and mechanics perspective; J Mater Sci (2017) 52:415-430;.

Zhu et al.; Stimuli-responsive cellulose nanomaterials for smart applications; Carbohydrate Polymers 235 (2020) 115933; 18 pages.

Zhu et al.; Bioinspired Smart Moisture Actuators Based on Nanoscale Cellulose Materials and Porous, Hydrophilic EVOH Nanofibrous Membranes; ACS Appl. Mater. Interfaces 2019, 11, 1440-1448.

Zimmerman et al.; Designing for a green chemistry future; Science 367, 397-400 (2020).

Abdullah et al.; Self-Folded Gripper-Like Architectures from Stimuli-Responsive Bilayers; Adv. Mater. 2018, 30, 1801669.

Abdulla et al.; Mismatch strain programmed shape transformation of curved bilayer-flexible support assembly; Extreme Mechanics Letters 7 (2016) 34-41.

Abraham et al.; Hygroscopic movements in Geraniaceae: the structural variations that are responsible for coiling or bending; New Phytologist (2013) 199: 584-594.

Abraham, et al.; Tilted cellulose arrangement as a novel mechanism for hygroscopic coiling in the stork's bill awn; J. R. Soc. Interface (2012) 9, 640-647; Aug. 24, 2011.

Armon et al.; Geometry and Mechanics in the Opening of Chiral Seed Pods; Science 333, 1726 (2011); DOI: 10.1126/science.1203874.

Bettotti et al.; Dynamics of Hydration of Nanocellulose Films; Adv. Mater. Interfaces 2016, 3, 1500415; 7 pages.

Cakmak et al.; Spore-Based Water-Resistant Water-Responsive Actuators with High Power Density; Adv. Mater. Technol. 2019, 4, 1800596; 8 pages.

Carter et al.; Protein Self-Assemblies That Can Generate, Hold, and Discharge Electric Potential in Response to Changes in Relative Humidity; J. Am. Chem. Soc. 2018, 140, 7144-7151.

Chen et al.; Scaling up nanoscale water-driven energy conversion into evaporation-driven engines and generators; Nature Communications | DOI: 10.1038/ncomms8346; 2015; 7 pages.

Chen et al.; Bacillus spores as building blocks for stimuliresponsive materials and nanogenerators; Published Online: Jan. 26, 2014 | DOI: 10.1038/NNANO.2013.290.

da Silva et al.; Direct Toner Printing: AVersatile Technology for Easy Fabrication of Flexible Miniaturized Electrodes; Electroanalysis 2018, 30, 345-352.

Dassault Systèmes Opens 2014 SIMULIA Community Conference, Highlighting Simulation in the Age of Experience; 2 pages.

Dawson et al; How Pine Cones Open; Nature | vol. 390 | 18/Dec. 25, 1997.

Day et al.; Anatomy of capsule dehiscence in sesame varieties; Journal of Agricultural Science, Cambridge (2000), 134, 45+53.

Deng et al.; An instant responsive polymer driven by anisotropy of crystal phases; Mater. Horiz., 2018, 5, 99; 9 pages.

Dong et al.; Multi-stimuli-responsive programmable biomimetic actuator; Nature Communications | (2019) 10:4087 | https://doi.org/10.1038/s41467-019-12044-5 |.

Elbaum et al.; The Role of Wheat Awns in the Seed Dispersal Unit; May 11, 2007 vol. 316 Science; 3 pages.

Erb et al.; Self-shaping composites with programmable bioinspired microstructures; Nature Communications | 4:1712 | DOI: 10.1038/ncomms2666 |.

Fan et al.; Transformation of hard pollen into soft matter; Nature Communications | (2020) 11:1449 | https://doi.org/10.1038/s41467-020-15294-w.

Cheng et al.; One Single Graphene Oxide Film for Responsive Actuation; ACS Nano 2016, 10, 9529-9535; 7 pages.

Faria, et al.; A few clarifications on MIRIBEL; Nat ure Nanotechnology | vol. 15 | Jan. 2020 | 2-4.

Hao, et al.; Kirigami-Design-Enabled Hydrogel Multimorphs with Application as a Multistate Switch; Adv. Mater. 2020, 32, 2000781; 6 pages.

Haslach; The Moisture and Rate-Dependent Mechanical Properties of Paper: A Review; Mechanics of Time-Dependent Materials 4: 169-210, 2000.

Hu et al.; Thin film wrinkling by strain mismatch on 3D surfaces; Extreme Mechanics Letters 8 (2016) 107-113.

Huang et al.; Controlled molecular self-assembly of complex three-dimensional structures in soft materials; 70-74 | PNAS | Jan. 2, 2018 | vol. 115 | No. 1.

Huang et al.; Differential growth and shape formation in plant organs; PNAS | Dec. 4, 2018 | vol. 115 | No. 49 | 12359-12364.

Jia et al.; Moisture Sensitive Smart Yarns and Textiles from Self-Balanced Silk Fiber Muscles; Adv. Funct. Mater. 2019, 29, 1808241.

Kuang et al.; Selectively aligned cellulose nanofibers towards high-performance soft actuators; Extreme Mechanics Letters 29 (2019) 100463.

Landrigan, et al.; Pollution, health, and the planet: time for decisive action; The Lancet; Published Online Oct. 19, 2017 http://dx.doi.org/10.1016/ S0140-6736(17)32588-6.

Lin et al.; Ultrastrong and Highly Sensitive Fiber Microactuators Constructed by Force-Reeled Silks; Adv. Sci. 2020, 7, 1902743.

Lin et al.; Blood exposure to graphene oxide may cause anaphylactic death innon-human primates; Nano Today 35 (2020) 100922.

Liu et al.; Spider dragline silk as torsional actuator driven by humidity; Liu et al., Sci. Adv. 2019; 5 : eaau9183 Mar. 1, 2019.

Liu et al.; Humidity- and Photo-Induced Mechanical Actuation of Cross-Linked Liquid Crystal Polymers; Adv. Mater. 2017, 29, 1604792.

Ma et al.; Programmable deformation of patterned bimorph actuator swarm; National Science Review 7: 775-785, 2020 doi: 10.1093/nsr/nwz219.

Reyssat et al.; Hygromorphs: from pine cones to biomimetic bilayers; J. R. Soc. Interface (2009) 6, 951-957.

Steven et al.; Silk/molecular conductor bilayer thin-films: properties and sensing functions; Mater. Horiz., 2014, 1, 522; 7 pages.

Thompson et al.; Inexpensive, rapid prototyping of microfluidic devices using overhead transparencies and a laser print, cut and laminate fabrication method; Nature Protocols; vol. 10. No. 6; 2015; 12 pages.

Troyano et al.; Programmable Self-Assembling 3D Architectures Generated by Patterning of Swellable MOF-Based Composite Films; Adv. Mater. 2019, 31, 1808235; 7 pages.

Vermeulen et al.; The exposome and health: Where chemistry meets biology; Science 367, 392-396 (2020); 5 pages.

Wang et al.; New insights and perspectives into biological materials for flexible electronics; Chem. Soc. Rev., 2017, 46, 6764;.

Wang et al.; Sensitive Humidity-Driven Reversible and Bidirectional Bending of Nanocellulose Thin Films as Bio-Inspired Actuation; Adv. Mater. Interfaces 2015, 2, 1500080; 7 pages.

Wang et al.; Harnessing the hygroscopic and biofluorescent behaviors of genetically tractable microbial cells to design biohybrid wearables; Sci. Adv. 2017;3: e1601984 May 19, 2017.

(56) References Cited

OTHER PUBLICATIONS

Wang et al.; Cooperative deformations of periodically patterned hydrogels; Sci. Adv. 2017;3: e1700348 Sep. 15, 2017.

Wu et al.; A bio-inspired cellulose nanocrystal-based nanocomposite photonic film with hyper-reflection and humidity-responsive actuator properties; J. Mater. Chem. C, 2016, 4, 9687.

Zhang et al.; Moisture-responsive films of cellulose stearoyl esters showing reversible shape transitions; Scientific Reports | 5:11011 | DOI: 10.1038/srep11011.

Zhang et al.; Light- and Humidity-Induced Motion of an Acidochromic Film; Angew. Chem. Int. Ed. 2015, 54, 8642-8647.

Zhang et al.; Vapomechanically Responsive Motion of Microchannel- Programmed Actuators; Adv. Mater. 2017, 29, 1702231.

Zhang et al.; Humidity- and Sunlight-Driven Motion of a Chemically Bonded Polymer Bilayer with Programmable Surface Patterns; ACS Appl. Mater. Interfaces 2017, 9, 41599-41606.

Zhang et al.; Directed Motility of Hygroresponsive Biomimetic Actuators; Adv. Funct. Mater. 2016, 26, 1040-1053.

Zhang et al.; Photogated humidity-driven motility; Nature Communications | 6:7429 | DOI: 10.1038/ncomms 8429 www.nature.com/ naturecommunications.

* cited by examiner

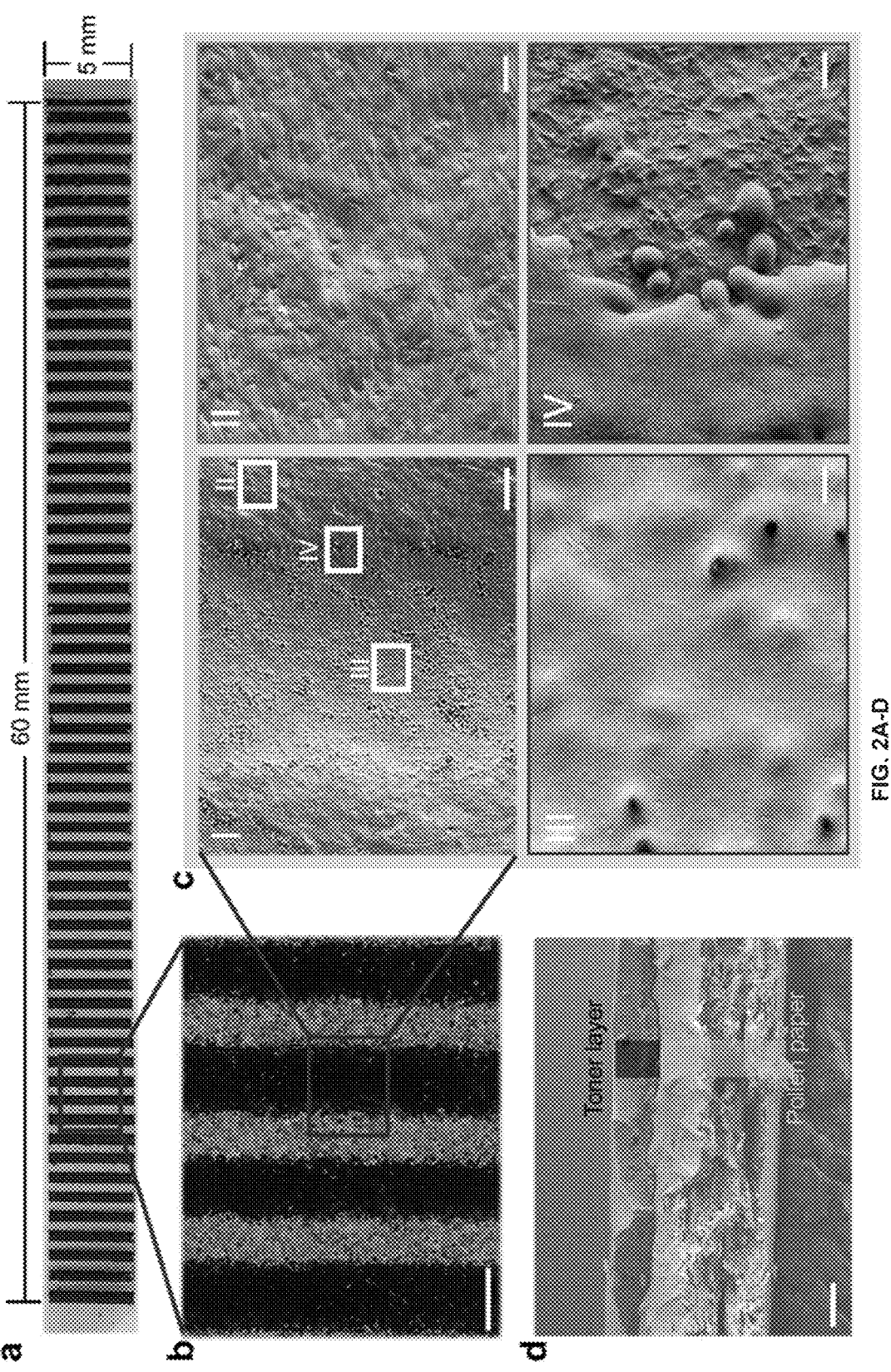
FIG. 2A-D

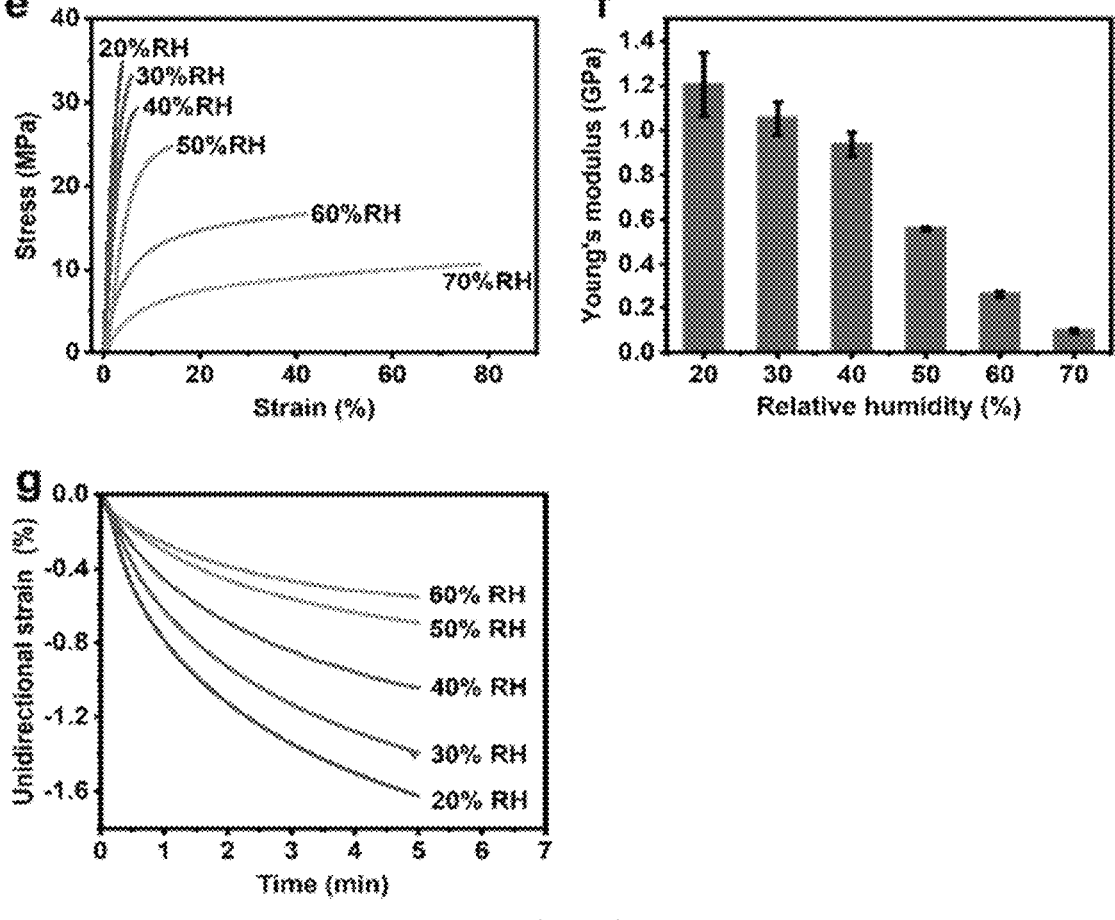
FIG. 2E-G

a
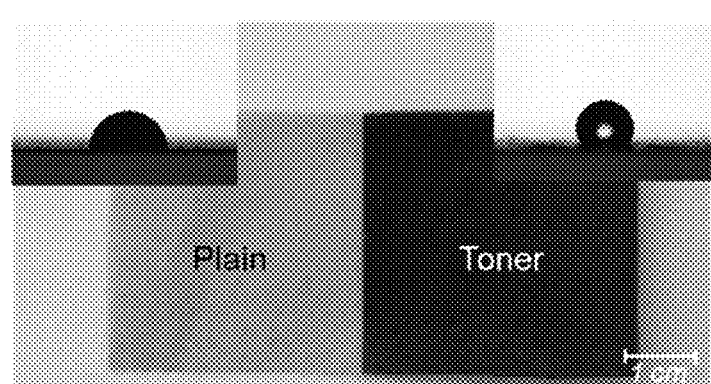
b
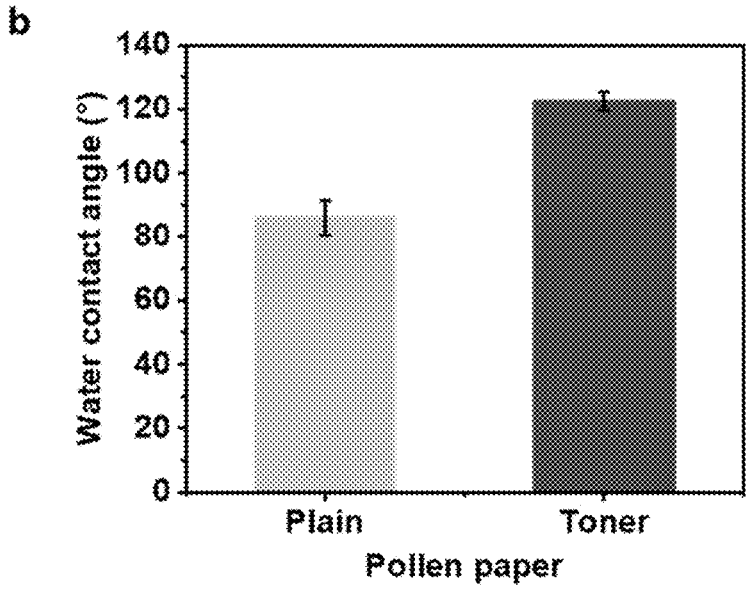
FIG. 4
FIG. 5

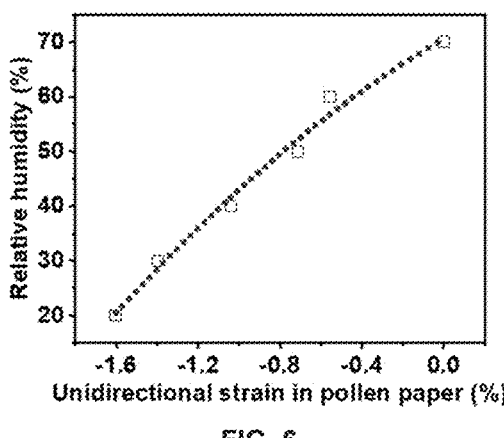
FIG. 6
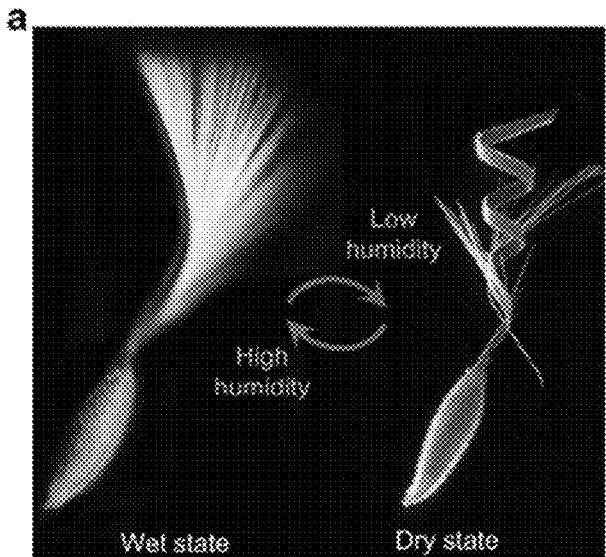
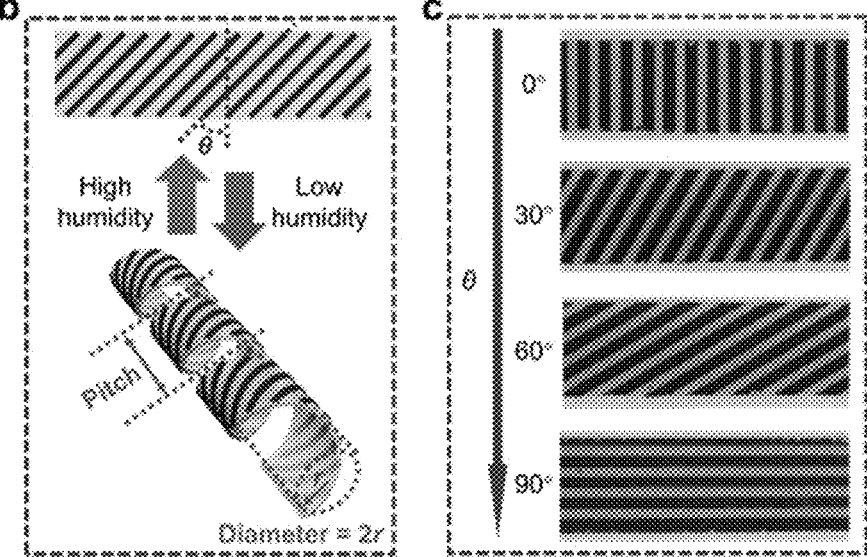
FIG. 7A-C

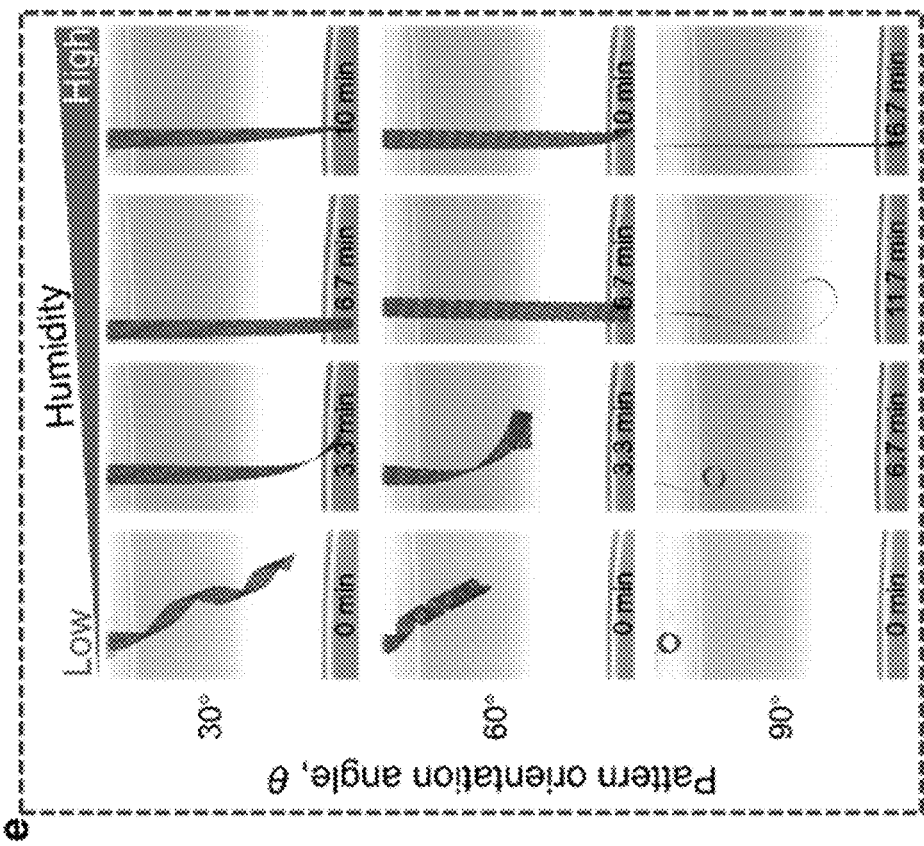
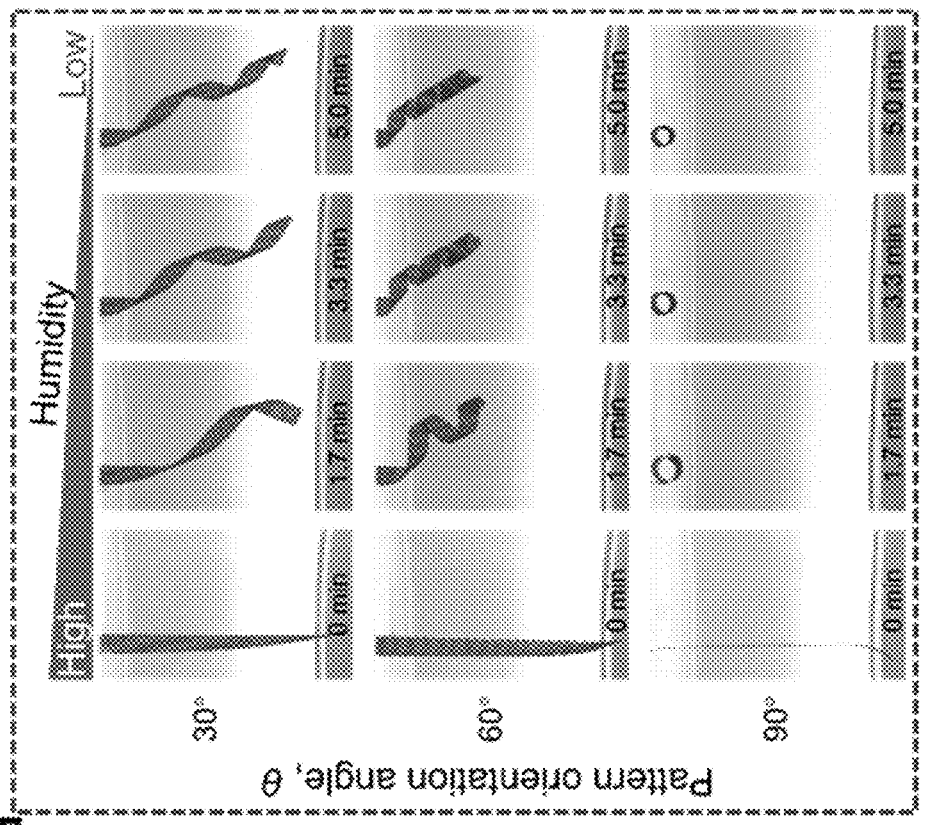
FIG. 7D-E

Digital printing

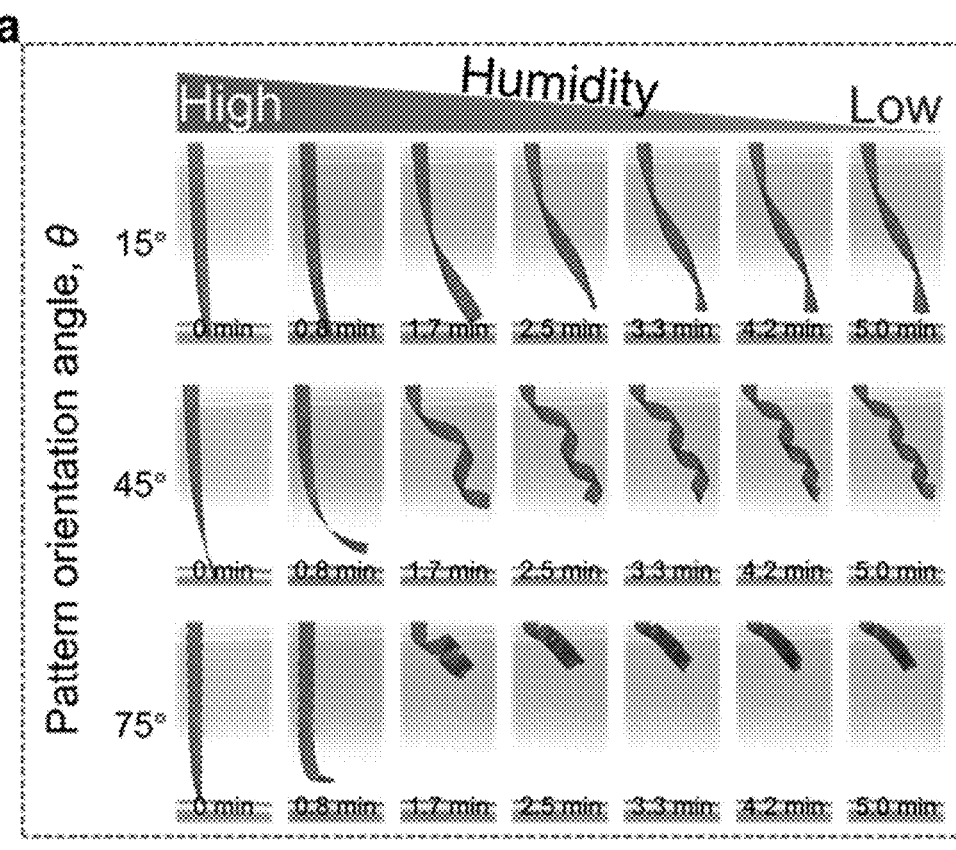
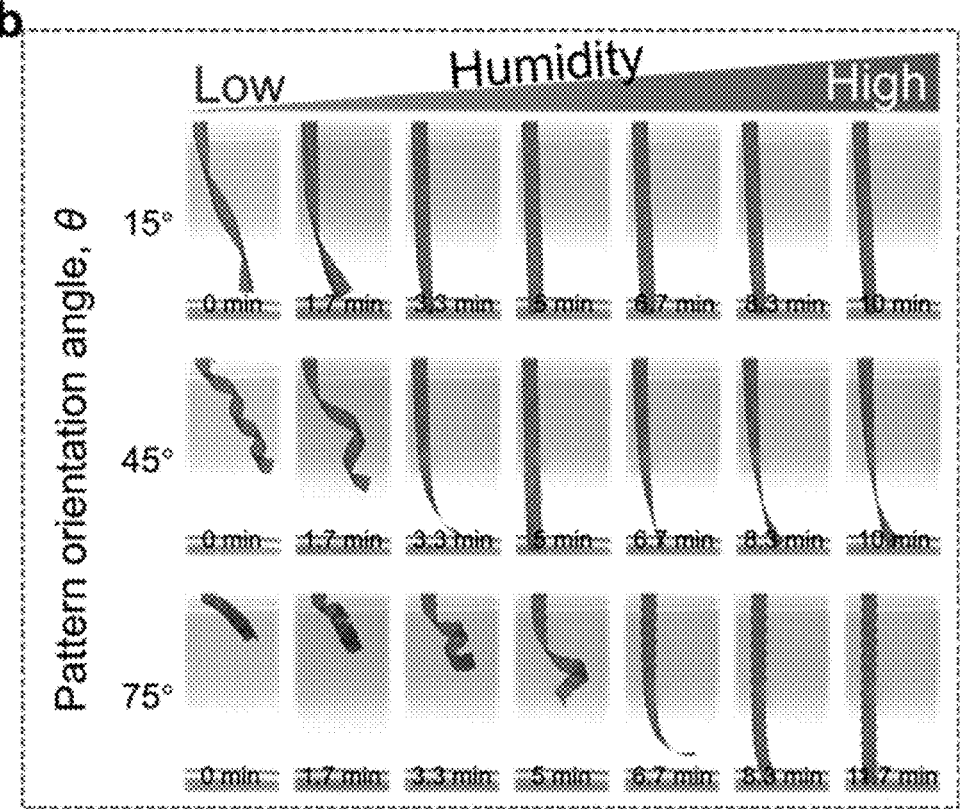
FIG. 10

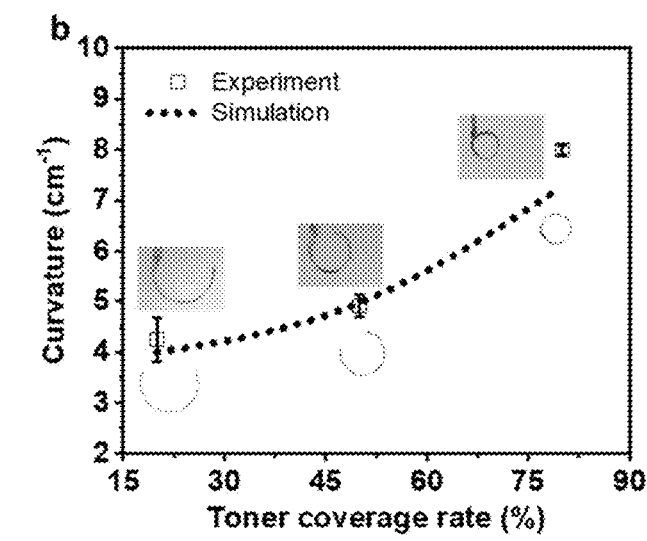
FIG. 12
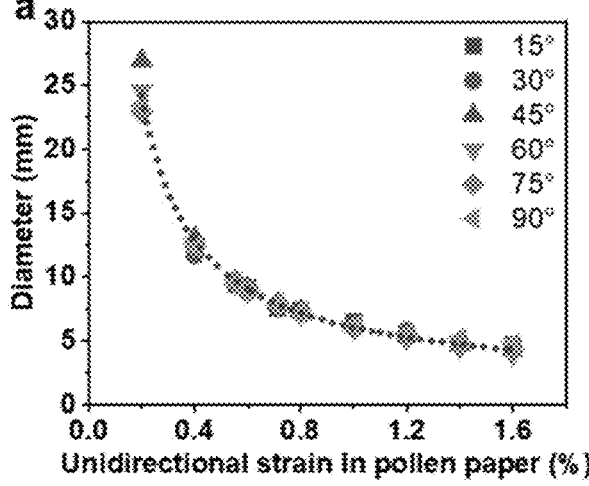
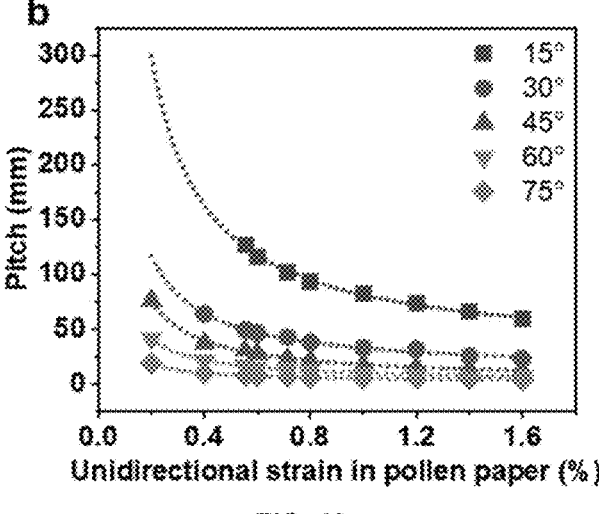
FIG. 13

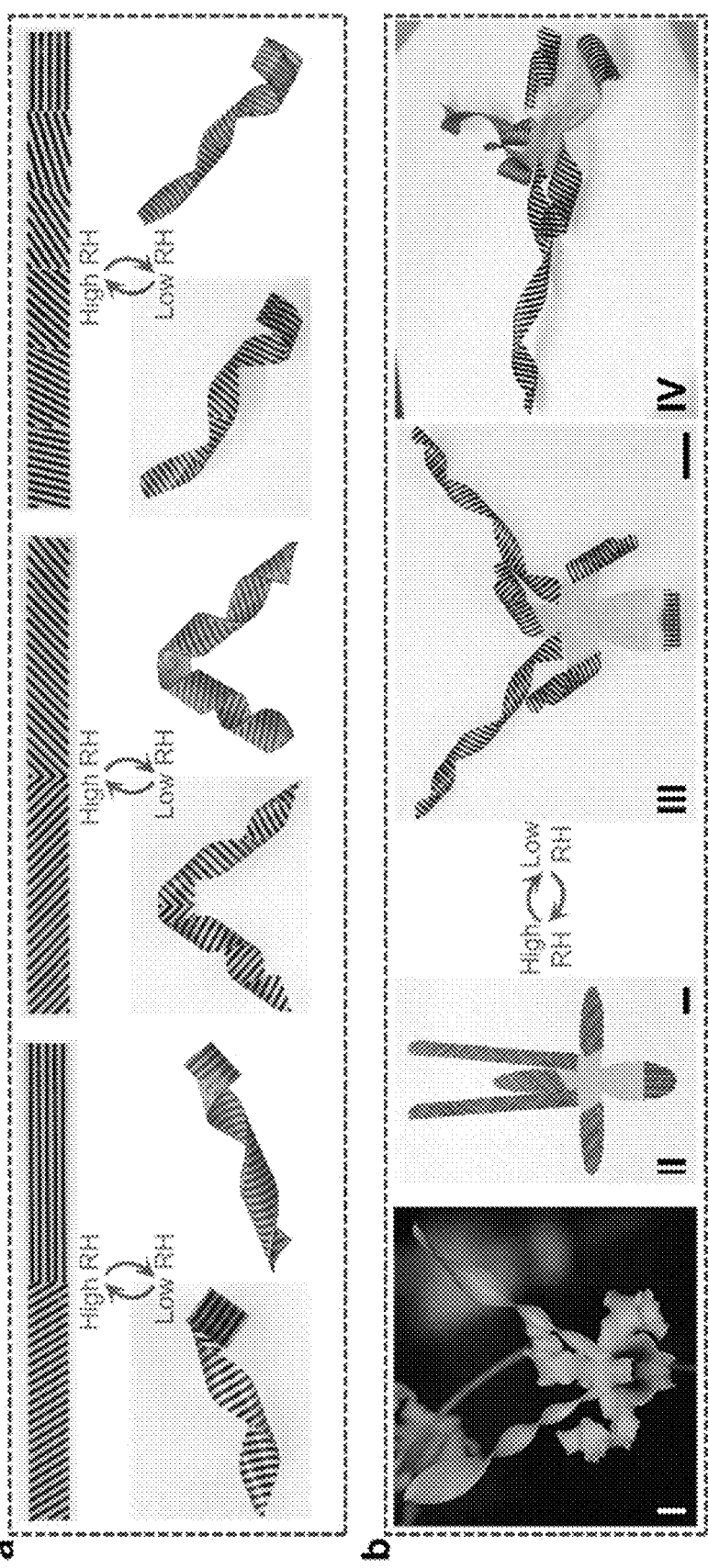
FIG. 15A-B

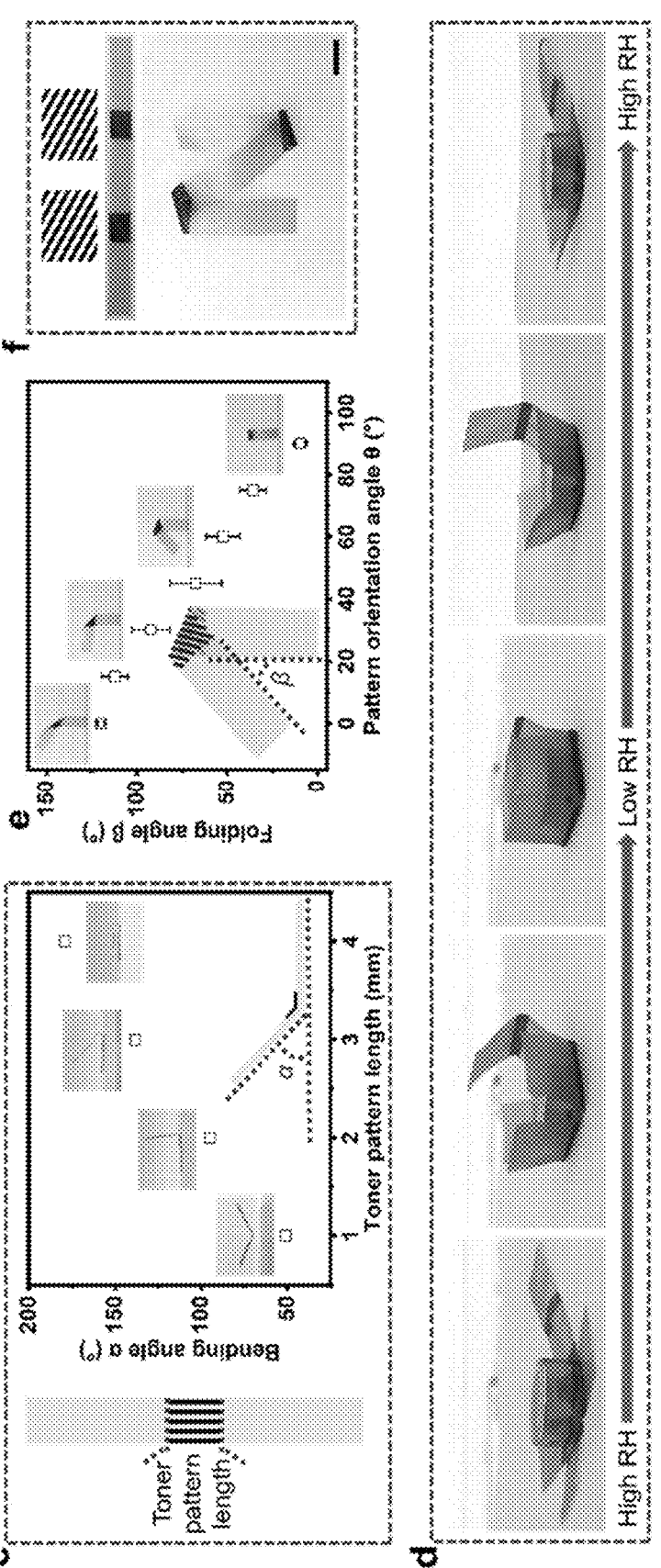
FIG. 15C-F a b 2 mm {

5 mm a b 2.5 mm {

5 mm c

High RH ➔ Low RH ➔ High RH

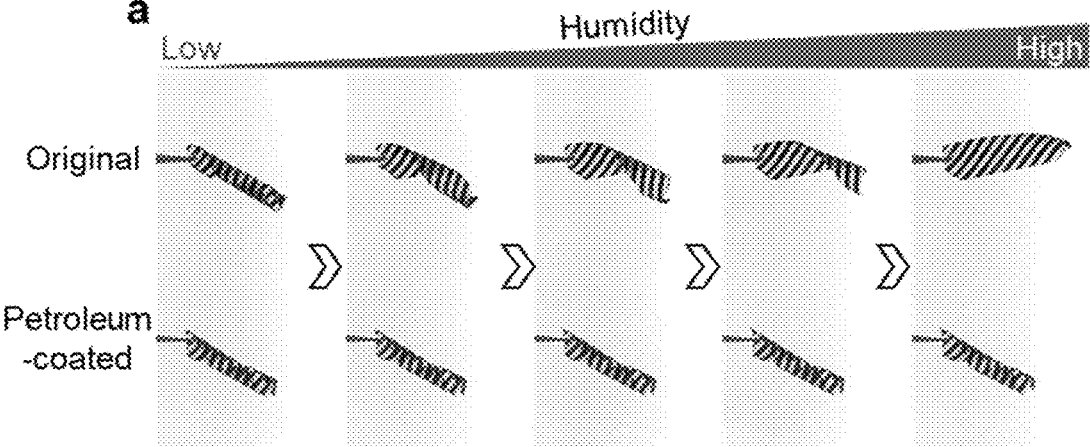
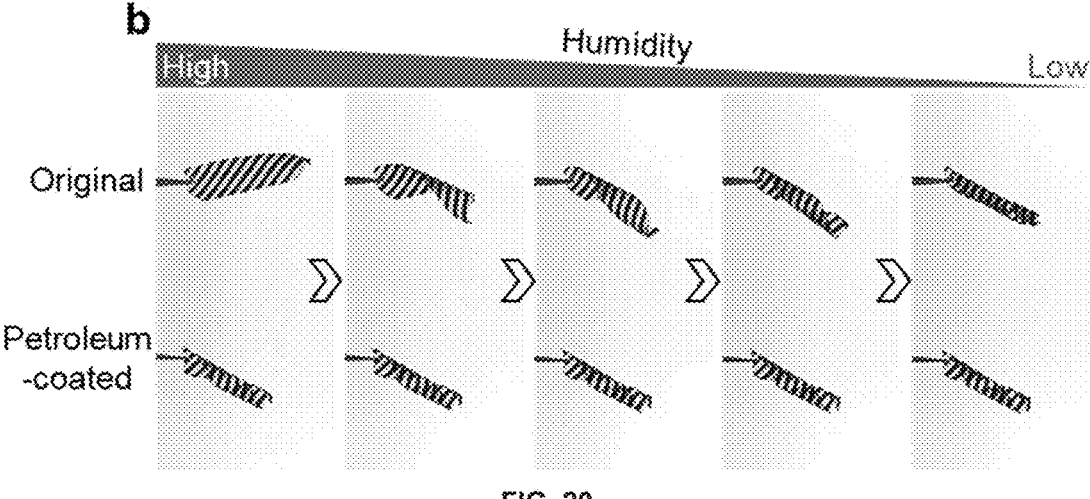
FIG. 20

HYGROMORPHIC COMPOSITE MATERIAL

FIELD OF INVENTION

This invention relates to digital printing of a paper formed from pollen microgels, which can lead to programmable, complex and reconfigurable hygromorphic deformation.

BACKGROUND

The listing or discussion of a prior-published document in this specification should not necessarily be taken as an acknowledgement that the document is part of the state of the art or is common general knowledge.

Materials capable of autonomously undergoing reversible changes in shape in response to environmental stimuli lead a rapidly growing body of scientific studies and applications in fields as diverse as clean energy harvesting, soft robotics, sensors, and flexible electronics. Most of the shape-morphing materials, especially some nanomaterials, however, rely on non-renewable fossil resources, which could lead to potential resource shortage, environmental damage, and health risk. As an alternative pathway to pursue green chemistry and environmental sustainability, biomaterials have also been explored for developing autonomously shape-morphing systems that respond to environmental stimuli. For example, controlled humidity changes can lead to significant alterations in mechanical deformability and geometric configurations of some biomaterials, including cellulose, agarose, silk, biocompatible hydrogel, and bacteria. However, most of these biomaterials need to be strictly extracted, synthesized, and processed from raw biomass, and often suffer from limitations in their propensity for shape transformation in response to moisture (Carter, N. A. & Grove, T. Z., *J. Am. Chem. Soc.* 2018, 140, 7144-7151; and Wang, M. et al., *Adv. Mater. Interfaces* 2015, 2, 1500080).

Attempts have been made to circumvent these limitations by incorporating mechanical constraints into a soft hygro-expandable matrix, by recourse to which pre-programmable motility can be achieved (Zhang, L. et al., *Adv. Funct. Mater.* 2016, 26, 1040-1053; Cakmak, O. et al., *Adv. Mater. Technol.* 2019, 4, 1800596; and Kuang, Y. et al., *Extreme Mech. Lett.* 2019, 29, 100463). Several techniques, like external field (Erb, R. M. et al., *Nat. Commun.* 2013, 4, 1712), photolithography (Ma, J. N. et al., *Natl. Sci. Rev.* 2020, 7, 775-785; and Wang, Z. J. et al., *Sci. Adv.* 2017, 3, e1700348), molding (Troyano, J., Came-Sanchez, A. & Maspoch, D., *Adv. Mater.* 2019, 31, 1808235; Zhang, L. et al., *Adv. Funct. Mater.* 2016, 26, 1040-1053; and Zhang, L. D. et al., *Adv. Mater.* 2017, 29, 1702231), and microstamping (Dong, Y. et al., *Nat. Commun.* 2019, 10, 4087), have also been used for patterning active and inactive components that respond to stimuli to realize complex dynamic deformation. However, heavy dependence on strict reaction control, elaborate processing equipment, and inflexible prefabricated templates hinder further development and potential deployment of available routes to eco-friendly shape-morphing materials.

Therefore, there exists a critical need to fabricate hygro-responsive and eco-friendly engineering components that are capable of large elastic deformation for sustainable applications, from easy-to-process natural biomaterials.

SUMMARY OF INVENTION

Aspects and embodiments of the invention will now be discussed by reference to the following numbered clauses.

1. A hygromorphic composite material, comprising:
   a moisture-active pollen paper substrate having a top and a bottom surface, where the pollen paper substrate is formed from a plurality of pollen microgel particles; and
   at least one moisture-inactive layer applied onto the top and/or bottom surface of the moisture-active pollen paper substrate, where the at least one moisture-inactive layer is formed from a toner and/or an ink, wherein
   the at least one moisture-inactive layer is formed with a pattern that causes the hygromorphic composite material to change its shape in a pre-determined manner due to a change in relative humidity of its ambient environment.

2. The hygromorphic composite material according to Clause 1, wherein the hygromorphic composite material adopts a three-dimensional structure upon exposure to an ambient environment having a relative humidity lower than that in which the moisture-active pollen paper substrate was formed in, optionally wherein the hygromorphic composite material adopts a three-dimensional structure upon exposure to an ambient environment having a relative humidity that is at least 5%, such as at least 10%, such as at least 15%, lower than that in which the moisture-active pollen paper substrate was formed in.

3. The hygromorphic composite material according to Clause 2, wherein a hygromorphic composite material formed at a relative humidity of 70% adopts a three-dimensional structure upon exposure to an ambient environment having a relative humidity of less than 70%, such as 60% or less.

4. The hygromorphic composite material according to any one of the preceding clauses, wherein the hygromorphic composite material has a deformability of from 0.1 to 0.3 $cm^{-1}\cdot\%$ $RH^{-1}$, such as from 0.14 to 0.25 $cm^{-1}\cdot\%$ $RH^{-1}$, such as about 0.16 $cm^{-1}\cdot\%$ $RH^{-1}$.

5. The hygromorphic composite material according to any one of the preceding clauses, wherein the toner and/or ink is a toner, optionally wherein the toner comprises a styrene acrylate copolymer, iron oxide, wax and amorphous silica.

6. The hygromorphic composite material according to any one of the preceding clauses, wherein the moisture-active pollen paper substrate has one or more of the following parameters:
   (ai) a thickness of from 10 to 5,000 μm, such as from 20 to 2,500 μm, such as from 30 to 1,000 μm, such as from 50 to 500 μm;
   (aii) a Young's modulus of from 75 to 2,000 MPa, such as from 80 to 1,200 MPa, such as from 90 to 1,130 MPa;
   (aiii) a Poisson's ratio of from 0.1 to 0.4, such as from 0.2 to 0.3, such as about 0.27; and
   (aiv) a maximum strain of from 0.001 to 3%, such as from 0.5 to 2%, such as from 1 to 1.6%.

7. The hygromorphic composite material according to any one of the preceding clauses, wherein the water contact angle of the hygromorphic composite material is from 75 to 95°, such as 85° on a section of the hygromorphic composite material only containing the moisture-active pollen paper substrate and/or from 115 to 135°, such as 125° on a section of the hygromorphic composite material that is fully covered by the toner and/or ink.

8. The hygromorphic composite material according to any one of the preceding clauses, wherein the conformation of the hygromorphic composite material upon changing the relative humidity in the ambient environment is affected by one or more of the following:

(bi) the shape of the hygromorphic composite material;

(bii) the thickness of the hygromorphic composite material;

(biii) the pattern of the toner and/or ink as applied to the top and/or bottom surface of the moisture-active pollen paper substrate;

(biv) the thickness of the toner and/or ink as applied to the top and/or bottom surface of the moisture-active pollen paper substrate; and (bv) the decrease or increase in the relative humidity from a starting relative humidity value.

9. The hygromorphic composite material according to any one of the preceding clauses, wherein the hygromorphic composite material is configured to adopt the shape of a container.

10. The hygromorphic composite material according to any one of the preceding clauses, wherein the hygromorphic composite material is coated with a conformational locking substance, optionally wherein the conformational locking substance is an oil- or wax-based material (e.g., one or more of the group consisting of petroleum jelly, Waxelene, unrefined coconut oil, cocoa butter, lanolin, and tallow), chitosan and/or a substance with a pH value of from 1 to 6, such as 3 to 5, when in an aqueous solution.

11. A strain sensor device comprising a hygromorphic composite material according to any one of Clauses 1 to 10 as a sensing element.

12. A food packaging container formed from a hygromorphic composite material according to any one of Clauses 1 to 10, wherein the hygromorphic composite material is configured to adopt the shape of a container.

13. A method of forming a hygromorphic composite material according to any one of Clauses 1 to 10, the method comprising the steps of:

(a) providing a moisture-active pollen paper substrate having a top and a bottom surface, where the pollen paper substrate is formed from a plurality of pollen microgel particles; and (b) printing toner and/or ink in a pattern on the top and/or bottom surface of the moisture-active pollen paper substrate.

DRAWINGS

FIG. 1 depicts the preparation of hygro-morphing pollen paper with digitally printed toner. (a) Schematic illustration of the fabrication of planar pollen paper through the transformation of pollen particles into pliable microgels and subsequent mold casting; (b) Schematic illustration showing the process of printing pre-designed toner patterns onto the pollen paper; (c) A photograph of a rectangular pollen paper printed with various toner patterns. The scale bar is 1 cm; (d) A rectangular pollen paper (2 cm×1 cm) with only right half laser-printed showing half rolling in response to the humidity stimulation. Top panel represents schematic illustration, and the bottom panel corresponding photographs from experiments. The scale bars are 5 mm; and (e) Schematic illustration of the strain mismatch created by water adsorption and desorption in the bilayer comprising the hydrophilic pollen paper and the hydrophobic styrene acrylate copolymer pattern (introduced through the laser toner).

FIG. 2 depicts the characterizations of the patterned toner/pollen paper bilayer film. (a) A photograph of a tailored toner-patterned pollen paper with a close-up (b)

showing four parallel toner lines on the surface. The scale bar is 0.5 mm; (c) (I) Single toner stripe on pollen paper and magnification of three areas: (II) surface of pollen paper; and (III) surface of printed toner, and the interface of pollen paper and toner. The scale bars are 100 $\mu$m and 10 $\mu$m in (1) and (II, III, IV), respectively; (d) Cross-section scanning electron microscopy (SEM) image of the interface between the toner and pollen layer. The scale bar is 5 $\mu$m; (e) The representative stress-strain curves of pollen paper measured in uniaxial tensile tests under different controlled relative humidity (RH) levels; (f) Young's modulus of pollen paper calculated from stress-strain curves under different RH levels; and (g) Shrinkage of the plain pollen paper upon reducing RH from 70% to lower levels led to autonomous contraction as a function of time, as shown from uniaxial strain measurements under zero applied stress.

FIG. 3 depicts the SEM images of the top and bottom surfaces of pollen paper before and after printing. (a) Top and (b) bottom surfaces of pollen paper at (I) lower and (II) higher magnification before printing; and (c) Top and (d) bottom surfaces of pollen paper at (I) lower and (II) higher magnification after printing. The scale bars of images at lower and higher magnification are 10 $\mu$m and 1 $\mu$m, respectively. There is no significant alteration in the rough micromorphology of pollen paper before and after printing, revealing the structural stability of pollen paper during the laser-printing process.

FIG. 4 depicts the comparison of the change in hydrophilicity of the pollen paper before and after laser-printing. (a) An image of a rectangular pollen paper with only right half laser-printed. The insets in the upper left and right corners show water droplets on the plain and toner-covered pollen paper, respectively; and (b) Water contact angles of the plain and the toner-covered pollen papers.

FIG. 5 depicts the degree of shrinkage (minus strain) for the pollen paper in 5 min under different low RH levels.

FIG. 6 depicts the relationship between the strain in pollen paper and the RH level. The discrete symbols represent experimental observations, and the dashed line represents the best fit to the experimental data.

FIG. 7 depicts the bioinspired self-coiling morphology stimulated by the change in RH. (a) The awn of an individual seed exhibiting straight and coiling morphology under wet and dry conditions, respectively. Photograph reproduced with written permission; (b) Schematic illustration of bioinspired coiling geometry and nomenclature of the patterned bilayer ribbon; (c) Images of bilayer ribbons with different toner pattern orientation angles, e; (d) Programmed self-coiling processes of the patterned bilayer ribbons with three different values of 9 in response to changes in RH from about 70% to about 20%; and (e) The uncoiling of the patterned bilayer ribbons upon reintroduction of moisture as RH is increased from 20% to 70%, showing the reversibility of the stimuli-sensitive response.

Figures 8, 9:
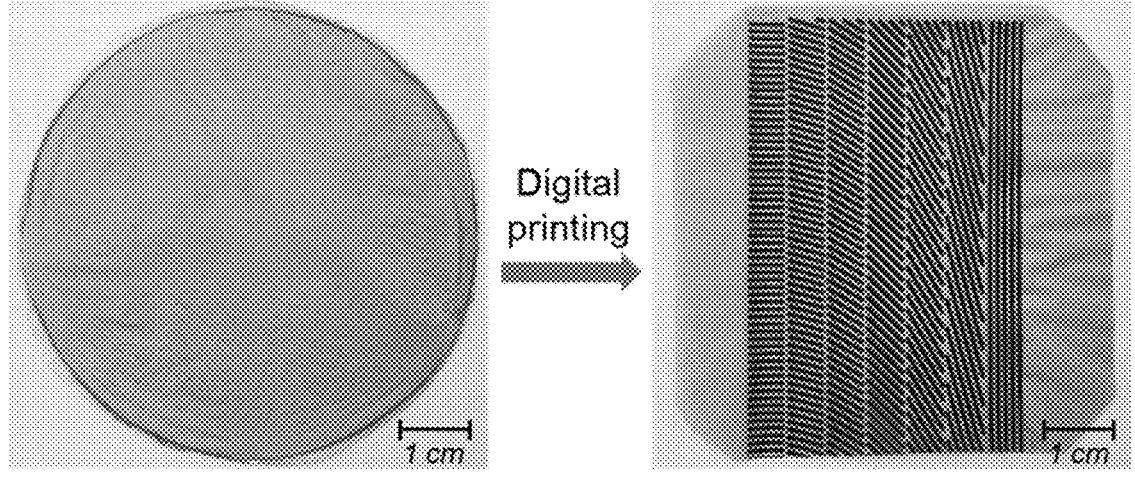

FIG. 8 depicts the pre-designed stripe patterns with various orientations were facilely and unilaterally printed on the planar pollen paper by a commercial laser printer.

FIG. 9 depicts the change in unidirectional strain of pollen paper as function of time in response to changes in RH between about 70% and 20%. The result demonstrates the asymmetric kinetics between moisture adsorption and desorption of pollen paper.

FIG. 10 depicts the coiling and uncoiling processes of the patterned bilayer ribbons with 15°, 45°, and 75° orientation angles ($\theta$). (a) The coiling of the samples with different $\theta$ in response to change in RH from about 70% to 20%; and (b)

The uncoiling of the corresponding samples in response to change in RH from about 20% to 70%.

Figure 11:
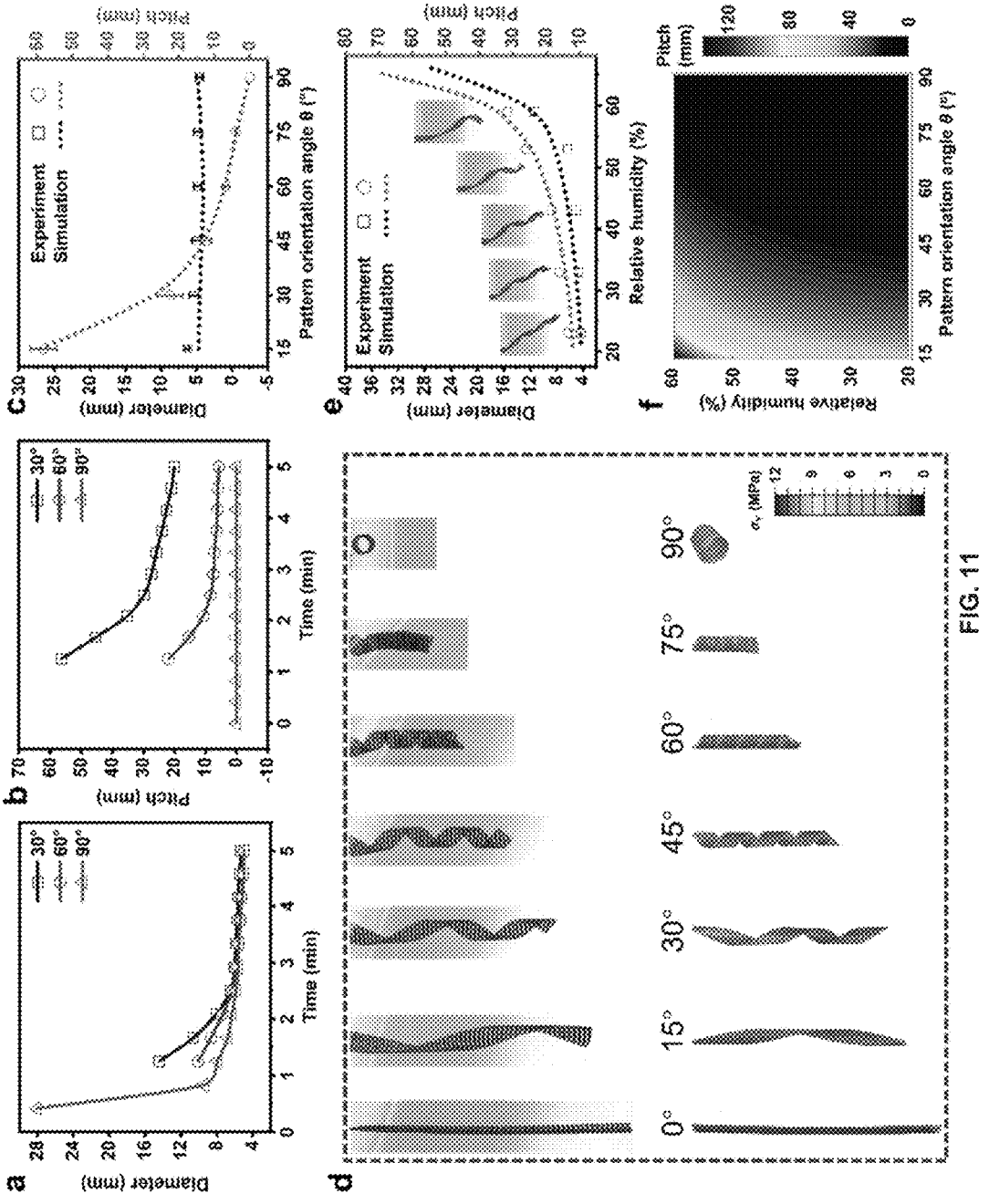

FIG. 11 depicts the quantitative details of key geometrical parameters during the autonomous shape evolution of the patterned bilayer ribbons. Evolution of coiling diameter (a) and pitch (b) as a function of time for three different values of the pattern orientation angle ($\theta$); (c) Variation of diameter and pitch of the coiled shape as a function of 9 in response to the RH of about 20%. The symbols represent experimental observations, and the dashed lines show the results obtained from simulations; (d) Photos (top panel) and the corresponding simulation results (bottom panel) of the coiled samples with varying degrees; (e) Variation of diameter and pitch of the coiled shape as a function of RH level at 9 of 45°. The symbols represent experimental observations, and the dashed lines show the results obtained from the finite element analysis (FEA) simulations; and (f) Contour plot of the pitch varying as a function of pattern orientation angle ($\theta$) and RH.

FIG. 12 depicts the effect of toner coverage ratio on the coiling degree of the bilayers exposed to low RH. (a) Photos of patterned bilayers with different toner coverage ratios; and (b) Variation of the curvature of the bilayers as a function of the toner coverage ratio. The symbols represent experimental observations, and the dashed line shows the results obtained from simulations.

FIG. 13 depicts the results of finite element method (FEM) simulation of shape evolution in patterned bilayer ribbons subjected to mismatch strain. (a) Predicted variation in diameter of self-coiled patterned bilayer ribbons for different values of pattern orientation angle ($\theta$) as a function of strain in pollen paper. The dashed line is the fitted curve of all modelling data; and (b) Predicted variation in pitch for different values of pattern orientation angle ($\theta$), as a function of strain. Dashed lines represent curves fitted to match the discrete data points for different values of $\theta$.

Figure 14:
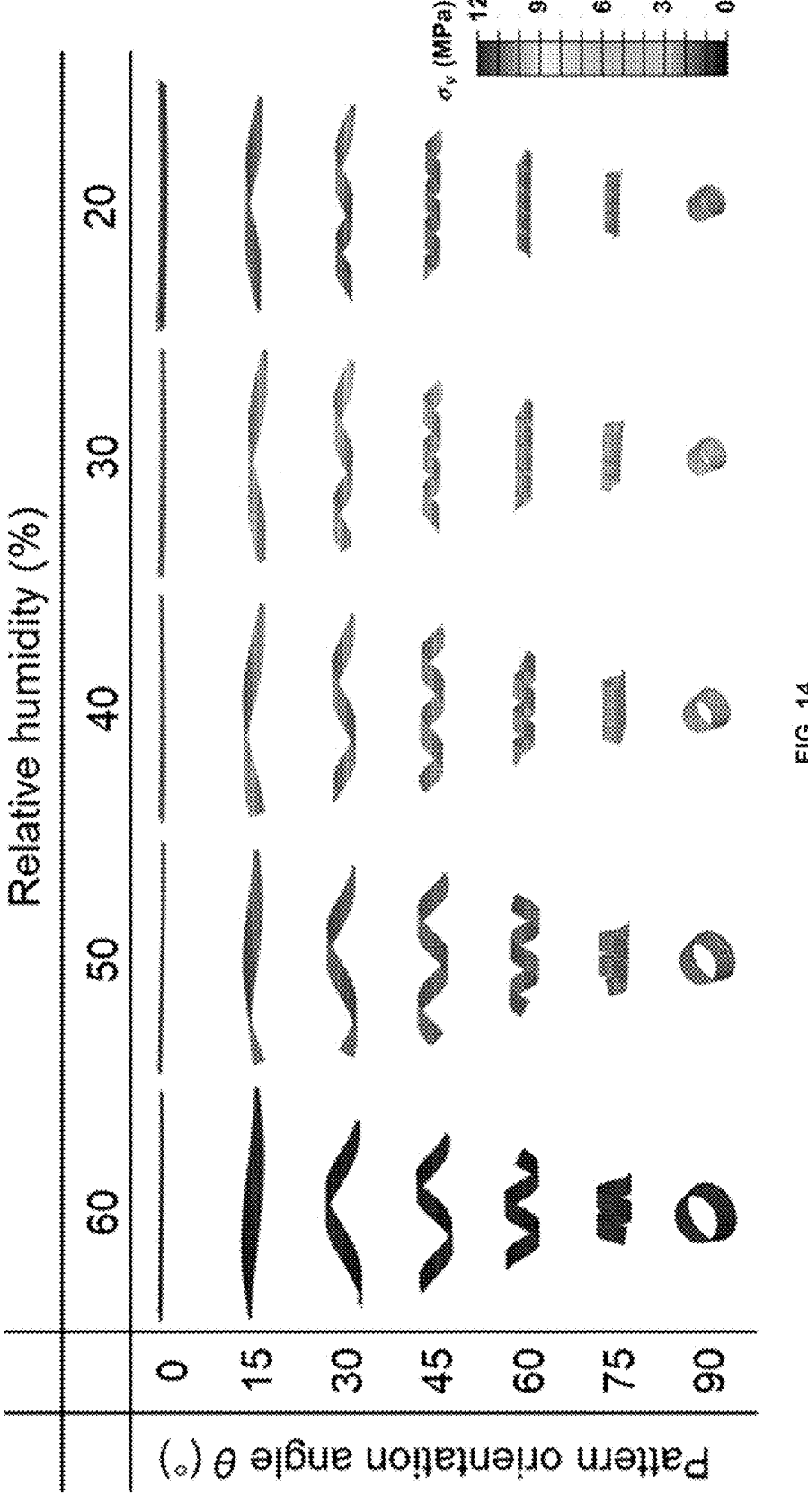

FIG. 14 depicts the representative configurations of coiled patterned bilayer ribbons with different pattern orientation angles under different RH conditions obtained from FEM simulations, where contours of von Mises stress were plotted.

FIG. 15 depicts the programmable hygromorphic deformation enabled through coordinating various patterned bilayer units. (a) 3D configurations of the bilayer ribbons with multiple coiling modes; (b) A bilayer-based biomimetic orchid Dendrobium helix in response to low RH level. I: an image of the Dendrobium helix; II: initial hydrated flat state; and Ill and IV: top view and side view of the dehydrated "blooming" state, respectively. The scale bars are 1 cm; (c) Variation of bending angle $\alpha$ as a function of toner pattern length in response to the RH of about 20%; (d) Reversible closing and opening of a 3D square box triggered by the change in RH level where the short patterned bilayers are hinges that dynamically respond to change in moisture level; (e) Variation of folding angle $\beta$ as a function of toner pattern orientation angle $\theta$ in response to the RH of about 20%; and (f) Self-morphing of pollen paper ribbons into the shape of letter "N" of the alphabet through the customized distribution of discrete toner patterns. The two schematic stripe patterns in the top panel indicate the orientations of the discrete toner patterns. The scale bar is 5 mm.

Figure 16:
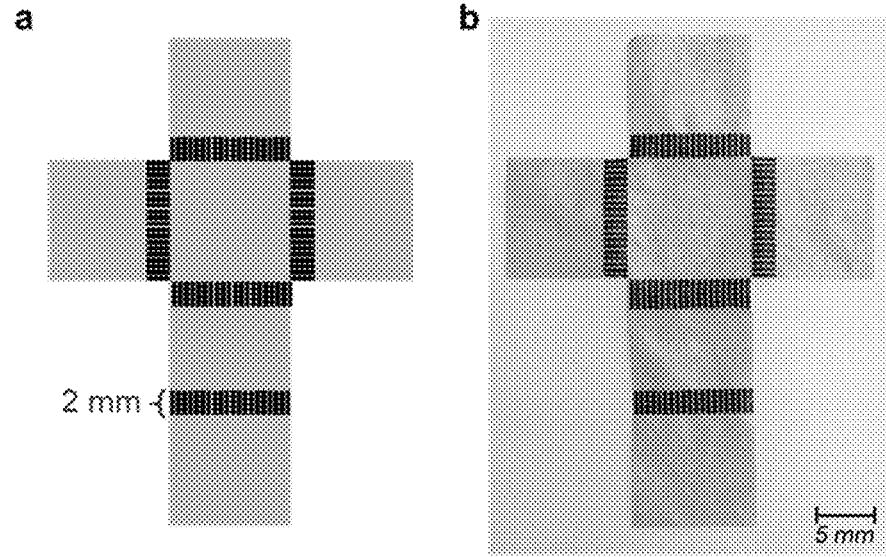

FIG. 16 depicts the net of the square box constructed from pollen paper with short toner patterns as hinges. (a) The geometric schematic design of the net, where the side length of each face is 1 cm and the toner pattern width, spacing and length are 0.4 mm, 0.1 mm and 2 mm, respectively; and (b) The photograph of the net at high RH level.

Figure 17:
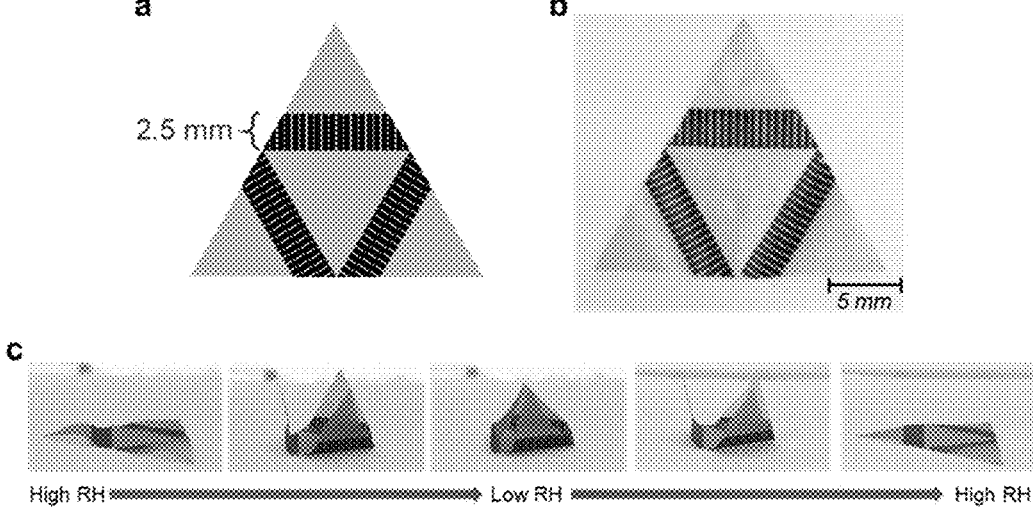

FIG. 17 depicts a triangular pyramid constructed from pollen paper with short toner patterns as hinges. (a) The geometric schematic design of the net of the triangular pyramid, where the side length of each face is 1 cm and the toner pattern width, spacing and length are 0.4 mm, 0.1 mm and 2.5 mm, respectively; (b) The photograph of the net at high RH; and (c) Reversible closing and opening of the triangular pyramid in response to the change in RH level.

Figure 18:
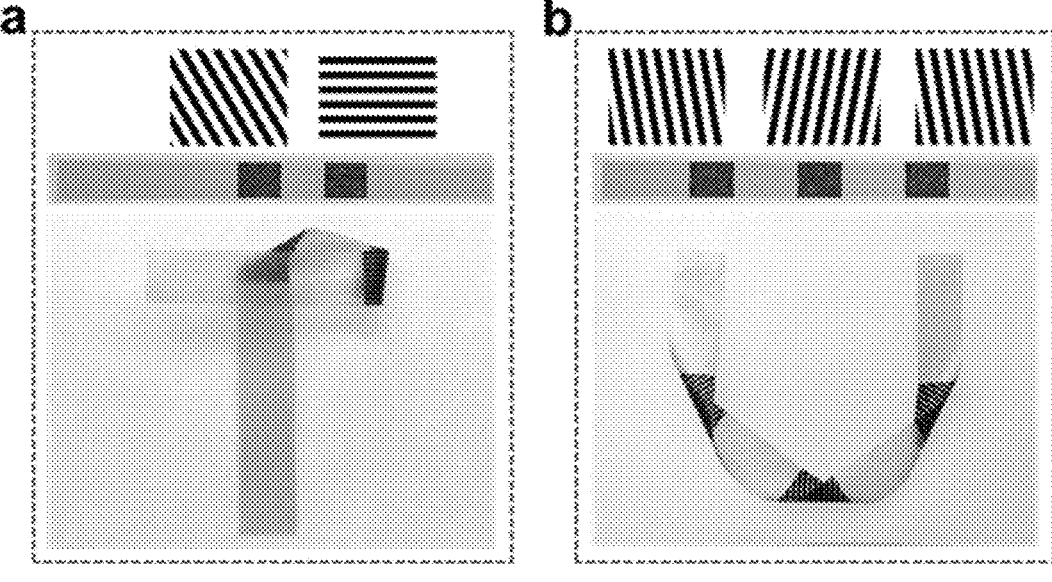

FIG. 18 depicts the self-morphing of pollen paper ribbons into the shape of different letters of the alphabet through the customized distribution of discrete toner patterns. (a) A shape of the letter "T"; and (b) A shape of the letter "U". The schematic stripe patterns in the top panels indicate the orientations of the discrete toner patterns.

Figure 19:
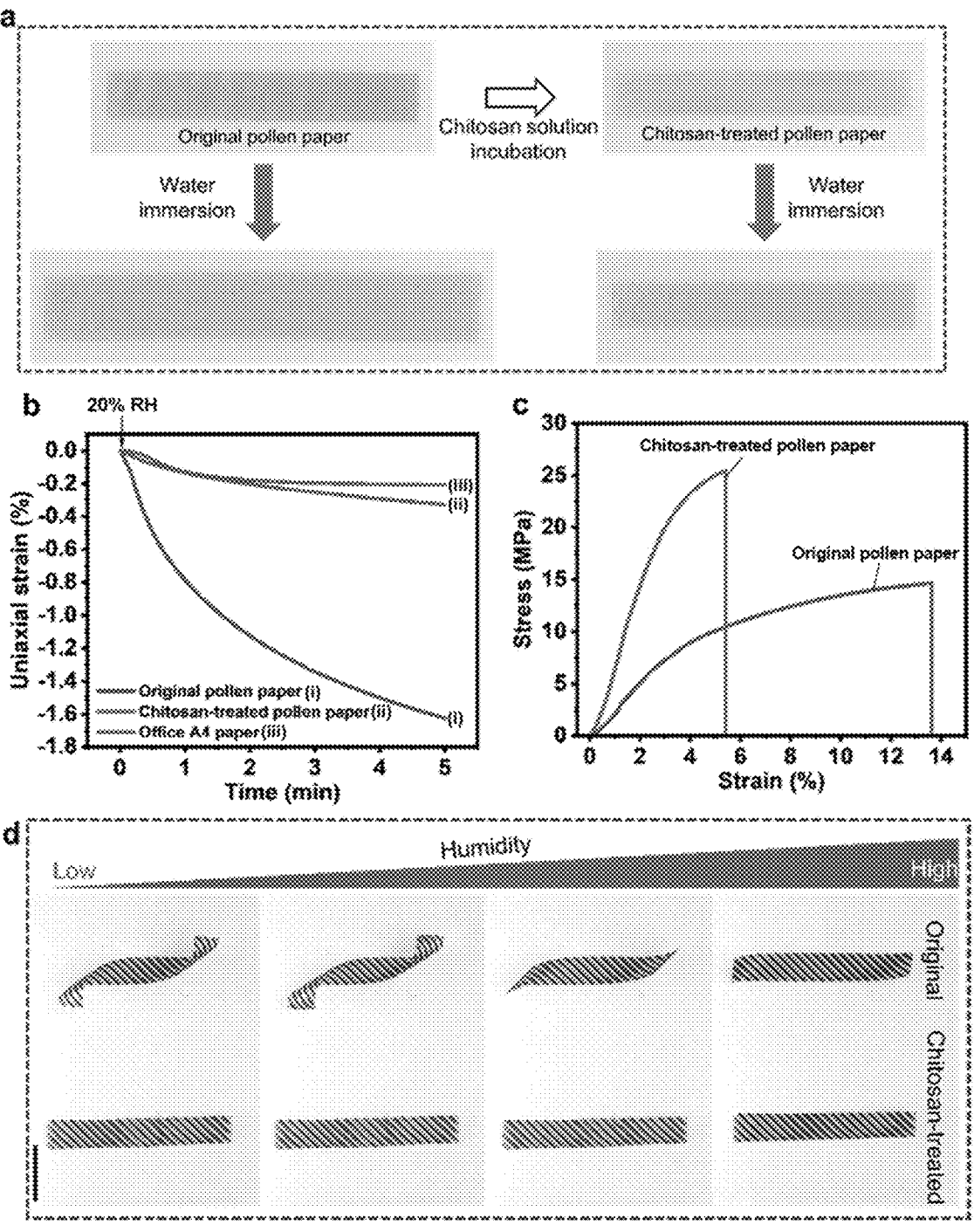

FIG. 19 depicts the turning off the deformability of the toner/pollen paper bilayer. (a) Photographs showing the different swelling between the original and chitosan-treated pollen paper after water immersion. The scale bar is 1 cm; (b) Shrinkage of the plain original and chitosan-treated pollen paper upon reducing relative humidity (RH) from 70% to 20% as a function of time, as shown from uniaxial strain measurements; (c) The representative stress-strain curves of original and chitosan-treated pollen paper measured in uniaxial tensile tests under RH of around 55%; and (d) Original and chitosan-treated pollen ribbons printed with toner patterns exhibited coiling and non-coiling, respectively, in response to RH change. The scale bar is 1 cm.

FIG. 20 depicts the image snapshots of the original and petroleum-coated patterned bilayer ribbon with a fixed initial shape in response to RH changes (a) from ~20% to ~70%, and then (b) from ~70% back to ~20%. Note that the petroleum-coated patterned bilayer ribbon did not exhibit humidity-responsive behavior and remained in the fixed coiling shape.

DESCRIPTION

The current invention relates to a material that can produce an autonomous, on-demand deformation in response to moisture using natural plant-based pollen materials and commercial digital printing technologies, where a bilayer film material is engineered, including a moisture-active and -inactive layer. The active layer is made of soft microgels processed from natural plant pollen. This step makes use of the inventors' recent discovery of how hard pollen can be transformed into a non-allergenic, soft microgel using a process somewhat analogous to simple soap-making. As such, the current invention makes use of a planar pollen paper, which can exhibit actuation in response to changes in humidity, and a moisture-inactive layer that may comprise hydrophobic particles from a standard ink or, more particularly, a laser toner (e.g. a styrene acrylate copolymer) digitally printed into custom-designed patterns on the active pollen paper layer to realize programmable deformation. Benefiting from the intrinsically large roughness of the pollen paper surface, the printed toner (or ink) can tightly bond to the pollen paper with high resolution, indicating the mechanical stability of the bilayer. By directly printing the toner into various patterns using laser (or other) printer, it is possible to precisely control the deforming morphology of the bilayer. Furthermore, the toner and/or ink coverage ratio, as well as relative humidity levels provide additional flexibility in tuning the degree of shape change.

Thus, in a first aspect of the invention, there is provided a hygromorphic composite material, comprising:

a moisture-active pollen paper substrate having a top and a bottom surface, where the pollen paper substrate is formed from a plurality of pollen microgel particles; and at least one moisture-inactive layer applied onto the top and/or bottom surface of the moisture-active pollen paper substrate, where the at least one moisture-inactive layer is formed from a toner and/or an ink, wherein the at least one moisture-inactive layer is formed with a pattern that causes the hygromorphic composite material to change its shape in a pre-determined manner due to a change in relative humidity of its ambient environment.

The current invention enables one to develop an easy and fast way of producing a moisture-sensitive biomaterial-based system that can morph reversibly on demand. Compared with other hygro-responsive shape-morphing materials that have been reported, the toner (and/or ink)/pollen paper bilayers exhibit enhanced ability of actuation. Based on the high flexibility and programmability of the toner/pollen paper bilayer, more complex shape-morphing architectures can be predictably constructed by coordinating various geometries and distributions of the toner patterns.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

The phrase, "consists essentially of" and its pseudonyms may be interpreted herein to refer to a material where minor impurities may be present. For example, the material may be greater than or equal to 90% pure, such as greater than 95% pure, such as greater than 97% pure, such as greater than 99% pure, such as greater than 99.9% pure, such as greater than 99.99% pure, such as greater than 99.999% pure, such as 100% pure.

When referred to herein, the term "pollen paper" refers to a paper that has been manufactured from pollen grains from a suitable source (e.g. sunflower and/or commercial raw bee pollen). The process to make the pollen paper first involves defatting the pollen, which can then be mixed with a solution (e.g. 10% w/w) of KOH at an elevated temperature (e.g. about 80° C.) for a suitable period of time (e.g. about 5 hours) to produce soft pollen microgels. These soft pollen microgels can then be collected and washed, cast into a mold and then left to dry to produce a pollen paper comprising the soft pollen microgels, which has a microscopically rough surface topography, owing to the intrinsic nano- and micro-structures of the self-assembled pollen grains. As will be appreciated, the dimensions of the paper are only limited by the casting mold used. It will be appreciated that any suitable pollen may be used to manufacture a pollen paper (e.g. sunflower pollen). This general process (which is discussed in more detail in the examples below) provides a moisture-active pollen paper that is not hygro-stable. As such, the moisture-active pollen paper will respond to changes in relative humidity and it has been surprisingly found that it is possible to predictably control the conformation adopted by the pollen paper by applying a patterned layer of a toner and/or ink onto at least one of the surfaces of the moisture-active pollen paper.

In embodiments disclosed herein, the moisture-active pollen paper substrate may have one or more of the following parameters:

(ai) a thickness of from 10 to 5,000 μm, such as from 20 to 2,500 μm, such as from 30 to 1,000 μm, such as from 50 to 500 μm;

(aii) a Young's modulus of from 75 to 2,000 MPa, such as from 80 to 1,200 MPa, such as from 90 to 1,130 MPa;

(aiii) a Poisson's ratio of from 0.1 to 0.4, such as from 0.2 to 0.3, such as about 0.27; and (aiv) a maximum strain of from 0.001 to 3%, such as from 0.5 to 2%, such as from 1 to 1.6%.

Any suitable toner or ink used for printing on conventional paper may be applied to the pollen paper. As such, the pollen paper may be printed upon by any commercially available printer or copiers, such as a laser printer, a photocopier, an inkjet printer and the like. In particular embodiments of the invention, the toner and/or ink may be hydrophilic or, more particularly, hydrophobic in nature. When used herein, the term "hydrophilic" may refer to a material that shows a water droplet contact angle of from 50 to 90°, while a "hydrophobic" material shows a water droplet contact angle of from greater than 90 to 150°.

In particular embodiments that may be mentioned herein, the toner and/or ink may be a toner. The toner may be any suitable toner. For example, the toner may comprise a styrene acrylate copolymer, iron oxide, wax and/or amorphous silica.

As noted above, the hygromorphic composite material disclosed herein can change its shape upon changes to the humidity in the ambient environment. In embodiments of the invention disclosed herein, the hygromorphic composite material adopts a three-dimensional structure upon exposure to an ambient environment having a relative humidity lower than that in which the moisture-active pollen paper substrate was formed in. As will be appreciated, when the moisture-active pollen paper substrate is formed, it is generally left to dry in the ambient environment, which may have any suitable relative humidity. For example, the relative humidity of the ambient environment may be from 10 to 80% relative humidity. As such, the hygromorphic composite material may display a change in its shape at any relative humidity below the relative humidity used to form the moisture-active pollen paper substrate. For example, in embodiments of the invention that may be mentioned herein, the hygromorphic composite material may adopt a three-dimensional structure upon exposure to an ambient environment having a relative humidity that is at least 5%, such as at least 10%, such as at least 15%, lower than that in which the moisture-active pollen paper substrate was formed in.

In particular embodiments of the invention that may be mentioned herein, a hygromorphic composite material formed at a relative humidity of 70% may adopt a three-dimensional structure upon exposure to an ambient environment having a relative humidity of less than 70%, such as 60% or less. In examples of this embodiment, the moisture-active pollen paper substrate may have been formed in (i.e. dried in) an ambient environment having a relative humidity of about 70% (i.e. from 68 to 72% relative humidity).

The hygromorphic composite material may have any suitable deformability. For example, the hygromorphic composite material may have a deformability of from 0.1 to 0.3 $cm^{-1}\cdot\%\,RH^{-1}$, such as from 0.14 to 0.25 $cm^{-1}\cdot\%\,RH^{-1}$, such as about 0.16 $cm^{-1}\cdot\%\,RH^{-1}$.

As noted hereinbefore, the hygromorphic composite material may be formed using a hydrophobic toner and/or ink. As such, in embodiments that may be mentioned herein, the hygromorphic composite material may have a water contact angle of from 75 to 95°, such as 85° on a section of the hygromorphic composite material only containing the moisture-active pollen paper substrate and/or from 115 to 135°, such as 125° on a section of the hygromorphic composite material that is fully covered by the toner and/or ink.

The conformation of the hygromorphic composite material upon changing the relative humidity in the ambient environment may be affected by one or more of the following:

(bi) the shape of the hygromorphic composite material;

(bii) the thickness of the hygromorphic composite material;

(biii) the pattern of the toner and/or ink as applied to the top and/or bottom surface of the moisture-active pollen paper substrate;

(biv) the thickness of the toner and/or ink as applied to the top and/or bottom surface of the moisture-active pollen paper substrate; and (bv) the decrease or increase in the relative humidity from a starting relative humidity value.

As described below in the examples section, it is possible to use a model to work out how changes in these variables affect the final conformation of the hygromorphic composite material. As such, it is possible to design the composite material's 2-dimensional (i.e. flat) shape and the pattern of the moisture-inactive layer(s) on the surface(s) of the moisture-active pollen paper substrate to achieve a desired conformation under the desired conditions. For example, in certain embodiments that may be mentioned herein, the hygromorphic composite material may be configured to adopt the shape of a container. That is, the hygromorphic composite material as generated in its 2-dimensional form from the moisture-active pollen paper substrate and the moisture-inactive layer may be configured to adopt the shape of a container. It will be appreciated that all the 3-dimensional geometries that can be constructed through folding polygons in the plane can be formed by designing the hygromorphic composite material and controlling the parameters mentioned above. Given this, it is possible for the hygromorphic composite material to adopt a conformation suitable for use as a food packaging, a food container, a drinking straw and the like.

In certain embodiments that may be mentioned herein, the hygromorphic composite material may be coated with a conformational locking substance. This conformational locking substance may be applied to the pollen paper before toner/ink printing, or after the hygromorphic composite material has adopted a desired conformation (e.g. a three-dimensional box shape). Any suitable substance that can conformationally lock the hygromorphic composite material may be used. For example, before toner/ink printing, the conformational locking substance may be chitosan and/or a substance with a pH value of from 1 to 6, such as 3 to 5, when in an aqueous solution. As will be appreciated, the application of chitosan and/or the substance with a pH value of from 1 to 6, such as 3 to 5 to the pollen paper may be a permanent lock, meaning that the paper will not deform due to changes in humidity. As such, these materials may preferably be used to lock the conformation of the paper (i.e. in a planar conformation) before it is printed upon by toner. However, it may be possible to use these materials after the paper has adopted a desired conformation in some instances. Alternatively, after the paper has adopted a desired conformation, a conformational locking substance such as oil- or wax-based materials may be applied to it. Examples of such oil- and wax-based materials include, but are not limited to petroleum jelly, Waxelene, unrefined coconut oil, cocoa butter, lanolin, tallow, and combinations thereof. For example, the conformational locking substance may be petroleum jelly.

The hygromorphic composite material may be used in a number of different applications. For example, the hygromorphic composite material may be used as part of a strain sensor device or as food container packaging.

Thus, in a further aspect of the invention, there is provided a strain sensor device comprising a hygromorphic composite material as described above as a sensing element. In yet a further aspect of the invention, there is also provided a food packaging container formed from a hygromorphic composite material as described hereinbefore, wherein the hygromorphic composite material is configured to adopt the shape of a container.

Examples of a device using a hygromorphic paper in a strain sensor device may be found in US patent application of publication number 2017/146445A1, which is herein incorporated by reference.

Further aspects and embodiments of the invention will now be discussed by reference to the following non-limiting examples.

EXAMPLES

Materials

Sunflower bee pollens (*Helianthus annuus* L.) were purchased from Shaanxi GTL Biotech Co., Ltd (Xi'an Shaanxi, China). Acetone, diethyl ether, chitosan, and potassium hydroxide (KOH) were purchased from Sigma-Aldrich Pte Ltd (Singapore). Nylon mesh was purchased from ELKO Filtering Co. LLC (United States of America).

Example 1. Pollen Paper Fabrication

Defatting Sunflower Bee Pollen

Sunflower bee pollen (250 g) was dispersed in deionised (DI) water (1 L, 50° C.) and stirred. The mixture was passed through a 200 μm nylon mesh to remove sand and other contaminants. After suction filtration, the collected powder was mixed with acetone (500 mL) and refluxed for 3 h at 50° C. The acetone washing step was repeated twice until the color of the pollen powder was stable, which was then left in the fume hood overnight to evaporate the acetone fully. After that, the resultant pollen powder (20 g) was mixed with diethyl ether (250 mL) under stirring at room temperature for 2 h, which was repeated two times. The pollen powder was separated from diethyl ether by filtration. Finally, the pollen powder was transferred to a petri dish and left to completely dry in the fume hood to get the defatted pollen (about 4 g).

Pollen Microgels Preparation

Detailed steps for the preparation of pollen microgels can be found in the inventors' recent work (Zhao, Z. et al., *Proc. Natl. Aced. Sci. U.S.A.* 2020, 117, 8711-8718), which mainly involved a two-step process, including cytoplasmic removal and KOH incubation.

Firstly, the defatted pollen (10 g) was mixed with KOH solution (10 wt % aqueous, 100 mL) under stirring for 2 h at 80° C., followed by centrifuging at 4500 rpm, 5 min. The precipitated sample was topped up and vortexed with a fresh 10% KOH solution (100 mL), followed by centrifugation again. The KOH washing step was repeated five times to remove the internal cytoplasm entirely. The washed sample was then re-suspended with a fresh 10% KOH solution (100 mL) and left in a hot plate oven set at 80° C. for 12 h to implement the KOH incubation. After that, the resulting pollen suspension was diluted with DI water until the pH was 7, and centrifuged to collect the pollen microgels which were stored at 4° C. for further utilization.

Pollen Paper Fabrication

Pre-prepared pollen microgel was adequately re-suspended in DI water, and cast into a petri dish to dry into a paper-like geometry in a dry box. After complete water evaporation, the paper was detached from the substrate's surface and then kept at ambient environment (the relative humidity was around 70%) for full equilibrium in moisture from the surroundings.

Results and Discussion

Figure 1:
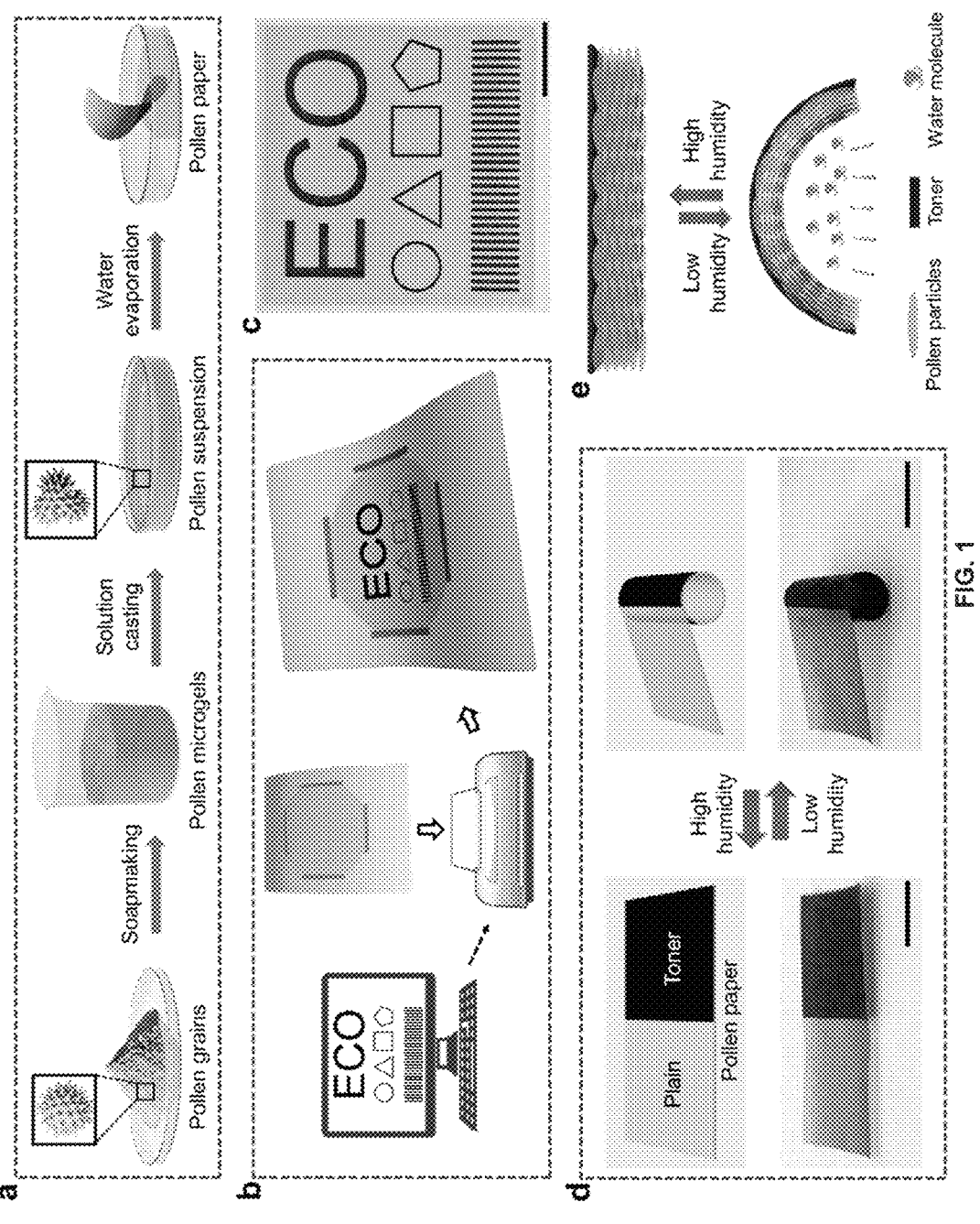

The planar pollen paper was fabricated by simple self-assembly of the pollen-derived microgels, as shown in FIG. 1. The robust sunflower (*Helianthus annuus*) pollen grains were first transformed into soft hollow microgels with opened apertures via two steps (Fan, T. F. et al., *Nat. Commun.* 2020, 11, 1449): defatting of bee pollen and the traditional soap-making process. The latter involves pollen shell extraction and subsequent alkaline incubation in 10 wt % KOH solution. The duration of KOH incubation employed was 12 h to facilitate extensive hydrolysis of pollen for fabricating the pollen paper with substantial hygroscopic expansion (Fan, T. F. et al., *Nat. Commun.* 2020, 11, 1449). After dilution to pH 7 with DI water, the resulting suspension of pollen microgels was directly cast into a mold (a large petri dish) to enable self-assembly of pliable pollen particles into flexible two-dimensional pollen paper after the evaporation of water (FIG. 1*a*). Considering the hygro-expansibility and potential digital printability of the resultant pollen paper (Zhao, Z. et al., *Proc. Natl. Acad. Sci. U.S.A.* 2020, 117, 8711-8718), the practical viability of the hypothesis underlying this work can be easily demonstrated by directly printing the hydrophobic toner onto the pollen paper using a standard laser printer (Thompson, B. L. et al., *Nat. Protoc.* 2015, 10, 875-886). The strategy adopted here readily provides an illustration of a cost-effective and time-saving process for producing moisture-responsive materials.

Example 2. Printing and Characterization of Toner-Patterned Pollen Paper

The desired patterns were prepared using AutoCAD 2018. The toner (HP 76X High Yield Black Original LaserJet Toner) patterns were printed on the pollen paper (prepared in Example 1) using a commercial laser printer (HP LaserJet Pro MFP M428fdn) at a resolution of 1200 dpi to give toner-patterned pollen paper. The toner composition is shown in Table 1, according to the material safety data sheet (MSDS, Safety data sheet of hp laserjet cf276a-x-xc print cartridge, Hewlett-Packard, Boise, ID, USA, 2020). After printing, the toner-patterned pollen papers were tailored into expected shapes to be tested based on the pre-designed layouts.

12

TABLE 1

The black toner cartridge's chemical composition used in the laser printer provided by the manufacturer (HP LaserJet Supplies).

| Chemical name | % Weight |
|---|---|
| Styrene acrylate copolymer | <50 |
| Iron oxide | <45 |
| Wax | <15 |
| Amorphous silica | <2 |

Characterization of Microstructure

SEM was used to observe the microstructure of the patterned bilayer film. Firstly, the samples tested were sputter-coated with gold (JEOL, Tokyo, Japan; operating settings) for 35 s. A JSM-7600F Schottky field-emission scanning electron microscope (JEOL) was then used to take the SEM images at an accelerating 5.00 kV voltage.

Results and Discussion

The printing of moisture-inactive layer of toner patterns onto the moisture-active pollen paper layer can simply be achieved by recourse to any accessible laser or ink-jet printer, as shown in FIG. 1*b*. (Instead of toner, one could also employ natural ink to print desired patterns so as to create a moisture-inactive layer.) Owing to its ease of access and customizability, laser/ink-jet printing technology facilitates direct transfer of various digitally custom-designed patterns onto pollen paper to achieve specific objectives (FIG. 1*c*).

Figure 3:
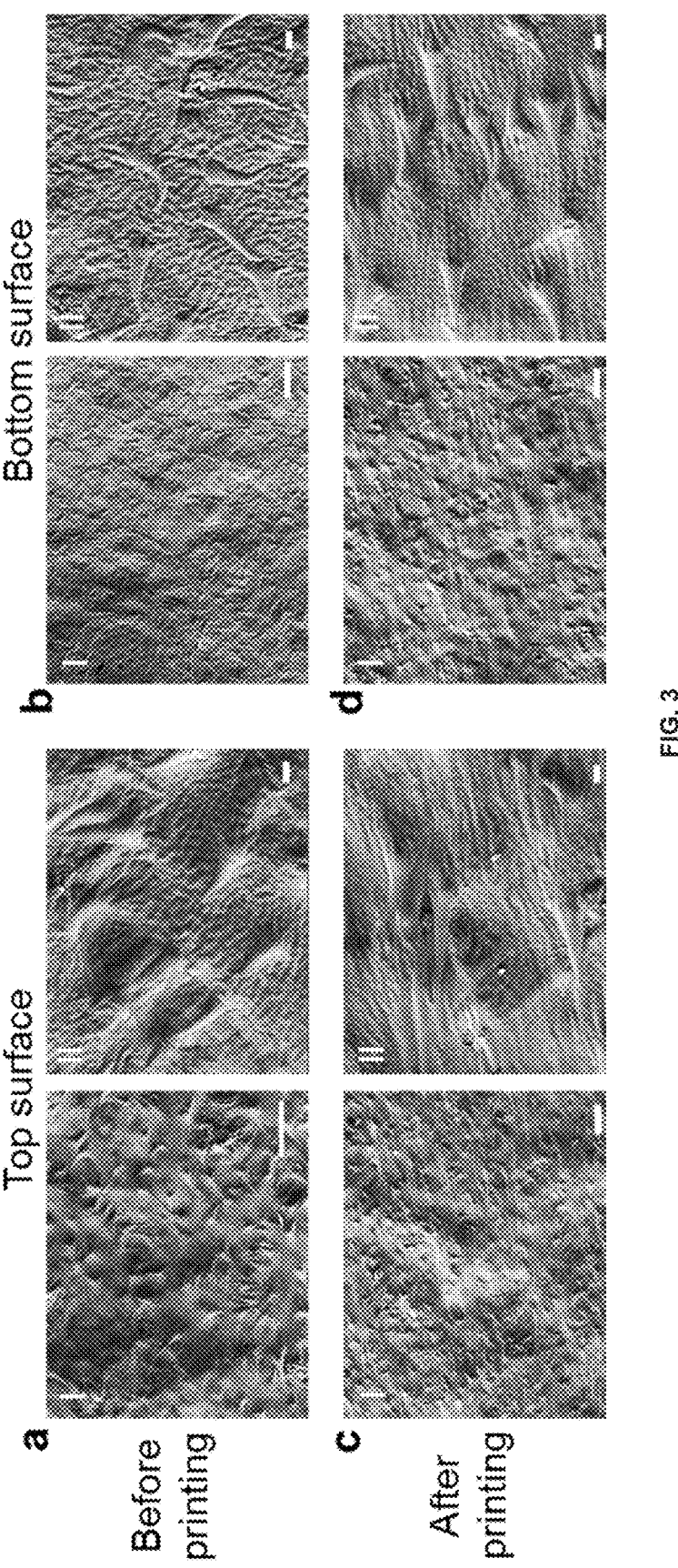

As shown in FIG. 2*a*, the pollen paper was designed to assume a ribbon shape, where a stripe pattern of toner was printed with pre-designed width and spacing, both 500 μm (FIG. 2*b*). In the magnified view of a single toner line on pollen paper (FIG. 2*c*(I)), the two parallel edges of the toner line with a width of ~500 μm are visible, which indicates the reliability of precision printing. In FIG. 2*c*(II), a naturally wrinkled surface microtopography was observed (Zhao, Z. et al., *Proc. Natl. Acad. Sci. U.S.A.* 2020, 117, 8711-8718). Additionally, the cross-section micrograph demonstrated good conformal contact between the toner and pollen paper layers, which adapts to the rough microtopography (FIG. 2*d*). The roughness of the pollen paper promotes interlayer adhesion, which contributes to the mechanical stability of the bilayer (FIG. 3).

Example 3. Water Contact Angle Measurement of Plain Pollen Paper and Toner-Printed Pollen Paper Water Contact Angle Measurement The water contact angles of the surfaces of different samples were determined by a tensiometer (Attension Theta, Biolin Scientific, Gothenburg, Sweden). OneAttension software was employed to analyze the water drop shapes.

Results and Discussion

Compared with plain pollen paper, toner-printed pollen paper exhibited a noticeable increase in water contact angle, indicating increased hydrophobicity as anticipated (da Silva, E. T. S. G., Alves, T. M. R. & Kubota, L. T., *Electroanalysis* 2018, 30, 345-352, see FIG. 4). When a pollen paper, with only half the page printed with toner, was exposed to low RH, the toner-printed part curled towards the pollen paper layer side while the part without toner remained unchanged (FIG. 1*d*). To analyze the significant difference in expansion between toner and pollen paper due to the absorption of water, a model for the hygro-morphing of toner/pollen paper bilayer was proposed in FIG. 1*e*. When the bilayer is exposed to low RH, the hygrophilic pollen paper layer shrinks due to water desorption. However, the hydrophobic toner layer is essentially inert to RH change and remains relatively undeformed. This causes a strain mismatch between the two layers, causing the bilayer film to curl macroscopically. Thus, here, a bilayer film material was engineered, with moisture-active and moisture-inactive constituent layers.

Example 4. Shape Evolution During Hygromorphic Deformation

To elucidate shape evolution during hygromorphic deformation of the bilayer, it is necessary to examine the changes in the mechanical and physical characteristics of the active layer, i.e., the plain pollen paper, in response to changes in RH.

Tensile Testing

A dynamic mechanical analyzer (DMA Q800, TA Instruments, New Castle, Delaware, USA) with RH control module (DMA-RH Accessory) was used to perform the tensile mechanical testing, where all tests were carried at 28° C. The gripped pollen paper sample (25 mm×5 mm×0.03 mm) was subjected to force at a rate of 1 N/min until failure to obtain stress versus strain curves under specific RH (20%, 30%, 40%, 50%, 60% or 70%). Each test was repeated three times. The Young's modulus of the pollen paper was calculated from the slope of the elastic ranges in the stress-strain curves. All data were processed with universal analysis 2000 software (TA Instruments, New Castle, Delaware, USA).

Measurement of Young's Modulus of Toner

To measure Young's modulus of the toner, the 4096 of the force versus displacement (FD) curve was obtained using the atomic force microscopy (AFM, NX-10, Park Systems, Suwon, South Korea) in the area of 3 μm×3 μm. The spring constant and deflection sensitivity of the AFM cantilever (AC160TS, a spring constant=~35 N/m) was calibrated by recourse to the thermal vibration using commercial software (Smart scan, Park Systems, Suwon, South Korea). The AFM cantilever was rinsed with water and ethanol and treated in an ultraviolet (UV) light cleaner for ~30 min to eliminate any contamination on the tip. For data analysis, the Hertzian model was used to fit the force versus displacement curves using a commercial software analysis program (Smart scan, Park Systems).

Measurement of the Hygroscopicity-Induced Unidirectional Strain of Pollen Paper Ribbons A thin ribbon of pollen paper (25 mm×5 mm×0.03 mm) was mounted in a film tension clamp on the DMA Q800 equipped with the DMA-RH Accessory to control RH. Given the surrounding humid environment (~70% RH), the pollen ribbons' contraction as the RH decreased from 70% to set values (20%, 30%, 40%, 50% or 60%) was measured. Then, the following method program was employed.

1) Stress=0 MPa (removes all residual force)
2) Equilibrate at 28.00° C. for 10 min
3) Measure Length
4) Data storage
5) Relative humidity x % (sets RH control, x=20%, 30%, 40%, 50% or 60%)
6) Isothermal for 10 min (allows time for the sample to equilibrate under set RH level)

The contraction was obtained from the strain recorded in the datasheet. The test was performed three times to get the average value.

Results and Discussion

FIG. 2*e* shows the stress-strain response of the plain pollen paper as a function of RH in a uniaxial tensile test. It is evident here that an increase in RH from 20% to 70% led to a monotonic increase in the deformability and strain to failure of the pollen paper as a result of the weakening induced by moisture absorption and to a corresponding reduction in the yield and tensile strength values. Accordingly, Young's modulus values calculated from the initial linear slopes of the corresponding stress-strain curves showed a reduction as the RH increased (FIG. 2*f*). The loss of water molecules upon change in RH from 70% to different lower levels caused shrinkage of the pollen paper. This dimensional change was measured unidirectionally in the absence of an externally imposed load or stress, and the corresponding strain was calculated on the basis of change in length over original reference length at 70% RH. The ensuing results are shown in FIGS. 2*g* and 5. By fitting the data with a polynomial function, we established the relationship between a specific RH value and the corresponding unidirectional strain in pollen paper (FIG. 6). These results provide a quantitative basis to predict and custom-design 3D shapes through autonomous responses to controlled levels of humidity.

In the plant kingdom, hygromorphic responses are observed as strategies developed through evolution in various seed dispersal systems (Dawson, C., Vincent, J. F. V. & Rocca, A. M., *Nature* 1997, 390, 668-668; Elbaum, R. et al., *Science* 2007, 316, 884-886; and Armon, S. et al., *Science* 2011, 333, 1726-1730) that exhibit different mechanical deformation modes (Reyssat, E. & Mahadevan, L., *J. R. Soc. Interface* 2009, 6, 951-957; and Day, J. S., *J. Agric. Sci.* 2000, 134, 45-53). This is driven by the differential response of different tissue architectures to changes in ambient RH levels. Self-sowing is a characteristic of the *Pelargonium* plant species' awn that can perform a reversibly macroscopic coiling deformation when exposed alternately to dry and wet environments (FIG. 7*a*, Abraham, Y. & Elbaum, R., *New Phytol.* 2013, 199, 584-594). This deformation strongly depends on the tilted orientation of the cellulose surrounding the cylindrical cells as a hygroactive layer in the awn (Abraham, Y. et al., *J. R. Soc. Interface* 2012, 9, 640-647). Here, inspired by the self-coiling of *Pelargonium* awn, the geometrical orientations of toner stripe patterns were aligned on the pollen paper to mimic the typical tilted architecture of the cellulose microfibrils in the awn (FIG. 8), and the coiling morphology of the bilayer was precisely controlled.

FIG. 7*b* schematically illustrates key geometric parameters and the associated nomenclature for planar and coiled configurations of the tailored patterned bilayer ribbon. Images of four bilayer ribbons with different toner pattern orientation angles (θ) from 0° to 90° are shown in FIG. 7*c*. The self-coiling shape evolution processes of the bilayers, which evolve autonomously in response to a reduction in RH from about 70% to about 20%, for three different orientation angles (30°, 60° and 90°) of the toner stripe patterns are shown in FIG. 7*d*. These time sequence images from the onset of reduction in humidity up to 5 min show that the orientation of toner stripe pattern can markedly influence shape evolution.

The observed shape evolution is primarily a consequence of the inactive layer's strong mechanical constraining effect on the deformation of the active pollen paper, with the geometric orientation of the pattern (Ma, J. N. et al., *Natl. Sci. Rev.* 2020, 7, 775-785) represented by the angle 9 strongly influencing the directionality and degree of constraint. This trend is also analogous to the process of shape evolution in thin films where the orientation of patterned lines on substrates (commonly encountered in microelectronic devices) can influence the evolution of substrate curvature and shape due to thermal mismatch between the layers (Freund, L. B. & Suresh, S., *Thin film materials: Stress, defect formation and surface evolution* (Cambridge university press, 2004)). When the toner was printed parallel to the short side of the pollen paper strip (i.e., $\theta=0°$), the sample coiled along the short axis. When toner was printed perpendicular to the short side of the paper (i.e., $\theta=90°$), the sample coiled along the long axis, leading to a ring morphology. For $0°<\theta<90°$, the sample assumed a coiled helical morphology, where shorter helices formed at higher values of 9 (FIG. 7*d*). Upon reintroduction of moisture, as RH was increased from 20% to 70%, full reversibility of deformation and shape was observed as shown in FIG. 7*e*. It was noted that the time to uncoil and reverse deformation upon an increase in RH is longer than during coiling because of the asymmetry in moisture absorption and desorption kinetics (see FIG. 9, Haslach, J. H. W., *Mech. Time-depend. Mat.* 2000, 4, 169-210). The effects of other orientation angles ($\theta$) of 15°, 45° and 75° on moisture-dependent shape evolution are illustrated in FIG. 10.

Example 5. Quantitative and Mechanistic Insights

Quantitative details of how the geometrical parameters evolve during the autonomous hygro-morphing of the patterned bilayer were obtained. A series of detailed computational simulations using the FEM was used to model and quantitatively predict the shape and geometry of the material deformation in response to humidity. These simulations provide a level of quantitative and mechanistic insights into the processing and performance characteristics of the material system that cannot be obtained solely from experiments.

Thickness Measurements

The thicknesses of the pristine pollen paper and the toner-covered pollen paper were measured by a micrometer (Order No. 293-240-30, Mitutoyo Asia Pacific Pte Ltd.).

Coiling Behavior Testing of the Patterned Bilayer Ribbons Responding to Change in RH Patterned bilayer ribbons (6 cm×0.5 cm) were hung in a chamber. The specific RH levels were made by saturated salt aqueous solutions, for example $CH_3COO—K^+$ (RH=23%), $MgCl_2$ (RH=33%), $K_2CO_3$ (RH=43%), $Mg(NO_3)_2$ (RH=53%), NaBr (RH=59%) and KI (RH=70%). These whole processes were recorded by an iPhone 6s (1920× 1080-pixel resolution, 60 frames per second, Apple Inc., Cupertino, Califomia, USA).

Computational Analysis

Finite element analysis (FEA) was conducted to understand the mechanisms underlying the humidity-controlled coiling of patterned toner/pollen paper bilayer using the commercially available package abaqus (Dassault systèmes, abaqus documentation. Dassault Systèmes, Providence, RI, USA (2014)). The coiling behaviour was modeled as a differential thermal expansion-driven shape transformation problem (Abdullah, A. M. et al., *Extreme Mech. Lett.* 2016, 7, 34-41; Hu, H. et al., *Extreme Mech. Lett.* 2016, 8, 107-113; and Abdullah, A. M. et al., *Adv. Mater.* 2018, 30, 1801669). More specifically, a hypothetical negative thermal expansion coefficient was assigned to the pollen paper to mimic its shrinkage during dehumidification. The system temperature was allowed to gradually increase from zero to a final value that would lead to a thermal strain equivalent to the strain caused by dehydration as measured in experiments. Considering that the toner is hydrophobic and does not absorb any moisture, the thermal strain produced in toner was kept at zero by assigning a zero thermal expansion coefficient in all the simulations. The strain mismatch between the pollen paper and toner layers is responsible for the ribbons' 3D coiling. It was modeled as a bilayer structure with toner and pollen paper as the top and bottom layers. Based on experimental measurements, the thickness of the pollen paper and toner were set as 30 μm and 5 μm in the simulations, respectively. Following the experimental setup, the samples with different orientations of toner patterns were simulated, where the pattern orientation angles between the toner strips and the short side of the pollen paper varied from 0° to 90°. A combination of homogeneous (for regions without toner) and composite (for regions with toner) shell sections was used in the simulations. The dimensions and properties of the pollen paper and toner are summarized in Table 2. The toner/pollen paper structure was meshed using an 8-node doubly curved thin shell with reduced integration shell elements (S8R5). A fixed boundary condition was applied at the middle point of one end to avoid any possible rigid body motion.

TABLE 2

| Dimensions and properties of pollen paper and toner used in the simulations. | | |
| --- | --- | --- |
| Parameter | Pollen paper | Toner |
| Thickness | 30 μm | 5 μm |
| Young's Modulus | 98.04-1127.39 MPa | 11 GPa |
| Poisson's Ratio | 0.27 | 0.4 |
| Maximum strain | 0-1.6% | 0 |

Results and Discussion

As shown in FIGS. 11*a* and *b*, both the coiling diameter and pitch decreased as a function of time, where the diameter of all samples almost reached similar steady states in about 5 min. To better understand the hygro-morphing process, this mismatch-induced self-coiling behaviour was modeled as shape transformation driven by differential thermal expansion by employing FEM (Abdullah, A. M. et al., *Extreme Mech. Lett.* 2016, 7, 34-41; Hu, H. et al., *Extreme Mech. Lett.* 2016, 8, 107-113; and Abdullah, A. M. et al., *Adv. Mater.* 2018, 30, 1801669). Based on both experimental and simulation results, the variations in coiling diameter and pitch as functions of $\theta$ were plotted at a fixed RH of about 20% in FIG. 11*c*. The pitch values decreased with increasing $\theta$, while the diameter remained relatively unaltered. During dehydration, shrinkage of the pollen paper drives the structure to bend towards the pollen paper side, and the axis of the coil is always perpendicular to the planes defined by each toner line. As demonstrated in FIG. 11*d*, when $\theta=0°$, the long side of the bilayer ribbon curled up; when $0°<\theta<90°$, the ribbon deformed into a coiled helical structure; and when $\theta=90°$, the short side curled up. The match between simulation results and experimental observation allows us to predict the coiling deformation with high fidelity. A higher toner coverage ratio can increase the strain mismatch between the toner and pollen paper layers during dehydration, leading to a tighter coiling of the bilayer. For a particular choice of geometrical parameters (length: 10 mm; width: 5 mm) with $\theta=90°$ at RH of about 20%, the bending curvature (1/r) increased from about 4 cm$^{-1}$ to 8 cm$^{-1}$ with an increase in toner coverage ratio from 20% to 80% (FIG. 12). Compared with other hygro-responsive shape-morphing materials, our toner/pollen paper bilayers exhibited enhanced ability of actuation, as summarized in Table 3.

TABLE 3

Typical deformable ability of hygro-responsive shape-morphing materials.

| Materials | Deformability $^a$ (cm$^{-1}$ · % RH$^{-1}$) | Structure | Reference |
|---|---|---|---|
| Toner/Pollen paper | 0.16 | Bilayers | This work |
| Iodine-doped rGO/rGO | 0.136 | Bilayers | Yang, J. et al., *Nano Energy* 2018, 53, 916-925 |
| GO | 0.114 | Asymmetrical microstructure | Zhang, Y. L. et al., *Adv. Mater.* 2019, 31, e1901585 |
| Spore/Polyimide | 0.068 | Bilayers | Cakmak, O. et al., *Adv. Mater. Technol.* 2019, 4, 1800596 |
| GO/prGO-PPy | 0.061 | Bilayers | Jiang, Y. et al., *ACS Nano* 2016, 10, 4735-4741 |
| SU-8/GO | 0.041 | Bilayers | Ma, J.-N. et al., *Natl. Sci. Rev.* 2020, 7, 775-785 |
| CNT-paper/BOPP | 0.030 | Bilayers | Weng, M. et al., *Adv. Funct. Mater.* 2016, 26, 7244-7253 |
| Toner-coated paper/BOPP | 0.029 | Bilayers | Chen, L. et al., *Sens. Actuators B Chem.* 2019, 282, 384-390 |
| PDA-RGO/NOA-63 | 0.019 | Bilayers | Ji, M. Y. et al., *Adv. Funct. Mater.* 2014, 24, 5412-5419 |
| Go/PMMA | 0.014 | Bilayers | Gao, Y. Y. et al., *ACS Appl. Mater. Interfaces* 2019, 11, 37130-37138 |

$^a$ The deformability (D) is defined as: D = ΔC/ΔRH, where ΔC is the bending curvature change of the shape-morphing materials, and the ΔRH is the change of the relative humidity.

The RH level is another critical factor influencing deformation because the pollen paper layer has an RH-dependent strain (FIG. 6). FIG. 11e reveals the rise in both pitch and diameter values with RH level for θ=45°. Based on FEM prediction, the helical structure's diameter was inversely proportional to the strain mismatch level in the bilayer, irrespective of the toner pattern orientation (FIG. 13a). In contrast, the pitch was determined collectively by the pattern orientation and strain mismatch level, which could be obtained through the relationship: P=2πr tan(90°−θ) (FIG. 13b). The contour plot in FIG. 11f illustrates how the pitch varies with θ and RH. For fixed θ, the pitch was reduced with a decrease in the RH level, and the diameter also followed a similar trend; for a fixed RH level, the pitch decreased with an increase in θ, while the diameter remained nearly the same, as shown in FIG. 14. Our experiments and simulations reveal a direct causal relationship between the coiling level and the residual stress caused by the strain mismatch between the pollen paper and toner for different values of RH. Taken together, the toner coverage rate, as well as RH levels, provide additional flexibility in tuning the degree of shape change.

Example 6. Complex Hygromorphic Configurations

Owing to the flexibility of digital laser printing, the pattern can be custom-designed onto the pollen paper to realize more complex hygromorphic configurations in a predictable way by designing different geometries and distributions of the toner patterns. This capability was demonstrated through experiments designed to produce complex shapes found in nature.

Results and Discussion

As shown in FIG. 15a, 3D configurations of the patterned pollen paper bilayers with multiple coiling modes were achieved by integrating two stripe patterns of distinctly different orientations (FIG. 15a, left) or even opposite orientations (FIG. 15a, middle). Furthermore, sequentially arranging the patterns of orientations from 15° to 90° into one ribbon generated a coiling structure with gradient pitches in response to the low RH (FIG. 15a, right). By distributing and tailoring these pattern units, we successfully reproduced the complex morphology of the flower, orchid Dendrobium helix, which consists of six petals and four different types of configuration units, as shown in FIG. 15b(I). When the initially planar sample (FIG. 15b(II)) was exposed to low RH, the discretely patterned bilayer in each "petal" morphed into desired 3D shapes and together formed a complete "flower". FIGS. 15b(III) and 15b(IV) show the top and side views of the complex biomimetic shape, respectively, which resemble a blooming orchid.

Due to its shape-morphing ability, the patterned bilayer has the potential to act as an active and dynamic hinge to rotate two connected pieces of pollen paper through a programmable bending angle made possible by locally printed pattern geometries, as shown in FIG. 15c. It was found that the bending angle α depends on the length of the pattern, in which a length of even only 2 mm can achieve a bending angle of about 90°. By combining this strategy with paper's geometric design, we created a 3D square box (2 mm pattern length) or a triangular pyramid (2.5 mm pattern length), whose closing and opening are triggered by a change in RH (FIGS. 15*d*, 16, and 17). Notably, the pollen papers on both sides of the hinge fold autonomously at a certain angle (denoted as folding angle β) when the orientation angle of the pattern is less than 90°, as shown in FIG. 15*e*. Therefore, it is feasible to realize complex programmable hygromorphic configurations by customizing the distribution and orientation of the discrete toner patterns. For example, a single pollen paper ribbon with two identical patterns with folding angles of 60° would deform into a shape of "N" (FIG. 15*f*). Based on the same scheme, alphabet letters "T" and "U" were also generated (FIG. 18). This feature enables us to develop a simple and efficient way of producing a moisture-sensitive biomaterial-based system that can morph reversibly on demand into desired geometrical configurations.

Example 7. Eliminating the Deformability of Toner/Pollen Paper Bilayer

We can eliminate the deformability of the toner/pollen paper bilayer by inhibiting the hygroexpansion of the pollen paper. Considering the substantial anionic surface charge of the KOH-incubated pollen particles, chitosan, a kind of ubiquitous polycationic biopolymer, was employed to form electrostatic bio-composites with the pollen paper for blocking its hydrophilic carboxylic acid functional groups. Tensile testing of the samples was performed by following the protocol in Example 4.

Chitosan Treatment of Pollen Paper

At first, 2% wt/vol chitosan solution was prepared by dissolving chitosan (2 g, low molecular weight) in acetic acid aqueous solution (1% vol/vol). Then, the resultant original pollen papers (prepared in Example 1) were submerged into the chitosan solution overnight, followed by washing three times with DI water. After drying, the chitosan-treated pollen papers were obtained. Then, toner pattern was printed on the chitosan-treated pollen paper by following the protocol in Example 2, to make the bilayer.

Results and Discussion

As shown in FIG. 19*a*, the pollen paper after chitosan solution incubation had almost no visible size changes when immersed in DI water. The hygroexpansion was measured in FIG. 19*b*. In contrast to the large shrinkage (over 1.6%) of the original pollen paper, the chitosan-treated pollen paper only uniaxially shrank about 0.3% within 5 min upon the change in RH from 70% to 20%, whose hygro-stability is similar to the general office A4 paper. Besides this, the incorporation of chitosan also improved the tensile strength of the pollen paper at a high RH level (FIG. 19*c*). The chitosan-treated pollen paper still maintained good flexibility and printability. The hygro-responsive behavior of the chitosan-treated pollen paper printed with a specific toner pattern was then tested, as shown in FIG. 19*d*. The chitosan-treated sample remained relatively stable in shape with RH changing, while the original pollen paper self-coiled as expected. Therefore, through chitosan treatment, we can effectively turn off the autonomous shape change when it is not desired. Furthermore, the propensity for the pollen paper to deform due to changes in humidity can be turned on or off through the appropriate design of environmentally-sustainable surface coatings so that programmable shape design can be preserved in service for different applications.

Example 8. Conformational Locking of Deformed Toner/Pollen Paper Bilayer

We can conformationally lock the hygromorphic toner/pollen paper bilayer (prepared in Example 2) by coating petroleum jelly, an environmentally friendly waterproof agent, after the hygromorphic composite material has adopted a desired conformation (e.g. a three-dimensional coiling or box shape). Due to the function as a water repellent, the petroleum jelly can keep the bilayer away from moisture in the air and render the paper insensitive to changes in humidity. Therefore, through conventional coating techniques, we can effectively turn off the autonomous shape change when it is not desired.

Petroleum Jelly Coating of the Deformed Toner/Pollen Paper Bilayer

At first, petroleum jelly (Vaseline®, Unilever, United States) was heated to 60° C. to become a liquid. Then, the toner/pollen paper bilayer which adopted a desired conformation was immersed into the liquid petroleum jelly for 10 s and taken out After removing the excess liquid from the surface, we allowed the bilayer to cool down at room temperature for 5 min to finish the coating.

Results and Discussion

As shown in FIG. 20, the original patterned bilayer ribbon without coating uncoiled when the humidity changed from low to high levels (FIG. 20*a*) and coiled back when the humidity changed from high to low levels (FIG. 20*b*). In contrast, the petroleum-coated patterned bilayer ribbon did not exhibit humidity-responsive behaviors and remained in the fixed coiling shape. Therefore, this work demonstrates the unique possibilities for producing autonomous, on-demand deformation in response to moisture using natural plant-based materials and commercial digital printing technologies.

The invention claimed is:
1. A hygromorphic composite material, comprising:
a moisture-active pollen paper substrate having a top and a bottom surface, where the pollen paper substrate is formed from a plurality of pollen microgel particles; and
at least one moisture-inactive layer applied onto the top and/or bottom surface of the moisture-active pollen paper substrate, where the at least one moisture-inactive layer is formed from a toner and/or an ink, wherein the at least one moisture-inactive layer is formed with a pattern that causes the hygromorphic composite material to change its shape in a pre-determined manner due to a change in relative humidity of its ambient environment.
2. The hygromorphic composite material according to claim 1, wherein the hygromorphic composite material adopts a three-dimensional structure upon exposure to an ambient environment having a relative humidity lower than that in which the moisture-active pollen paper substrate was formed in.
3. The hygromorphic composite material according to claim 2, wherein a hygromorphic composite material formed at a relative humidity of 70% adopts a three-dimensional structure upon exposure to an ambient environment having a relative humidity of less than 70%.

4. The hygromorphic composite material according to claim 2, wherein the hygromorphic composite material adopts a three-dimensional structure upon exposure to an ambient environment having a relative humidity that is at least 5% lower than that in which the moisture-active pollen paper substrate was formed in.

5. The hygromorphic composite material according to claim 1, wherein the hygromorphic composite material has a deformability of from 0.1 to 0.3 cm$^{-1}$·% RH$^{-1}$.

6. The hygromorphic composite material according to claim 1, wherein the toner and/or ink is a toner.

7. The hygromorphic composite material according claim 1, wherein the moisture-active pollen paper substrate has one or more of the following parameters:

(ai) a thickness of from 10 to 5,000 μm;

(aii) a Young's modulus of from 75 to 2,000 MPa;

(aiii) a Poisson's ratio of from 0.1 to 0.4; and (aiv) a maximum strain of from 0.001 to 3%, such as from 0.5 to 2%.

8. The hygromorphic composite material according claim 1, wherein the water contact angle of the hygromorphic composite material is from 75 to 95° on a section of the hygromorphic composite material only containing the moisture-active pollen paper substrate and/or from 115 to 135° on a section of the hygromorphic composite material that is fully covered by the toner and/or ink.

9. The hygromorphic composite material according to claim 1, wherein the conformation of the hygromorphic composite material upon changing the relative humidity in the ambient environment is affected by one or more of the following:

(bi) the shape of the hygromorphic composite material;

(bii) the thickness of the hygromorphic composite material;

(biii) the pattern of the toner and/or ink as applied to the top and/or bottom surface of the moisture-active pollen paper substrate;

(biv) the thickness of the toner and/or ink as applied to the top and/or bottom surface of the moisture-active pollen paper substrate; and (bv) the decrease or increase in the relative humidity from a starting relative humidity value.

10. The hygromorphic composite material according to claim 1, wherein the hygromorphic composite material is configured to adopt the shape of a container.

11. The hygromorphic composite material according to claim 1, wherein the hygromorphic composite material is coated with a conformational locking substance.

12. The hygromorphic composite material according to claim 11, wherein the conformational locking substance is selected from one or more of an oil- or wax-based material, chitosan and a substance with a pH value of from 1 to 6 when in an aqueous solution.

13. A strain sensor device comprising a hygromorphic composite material according to claim 1 as a sensing element.

14. A food packaging container formed from a hygromorphic composite material according to claim 1, wherein the hygromorphic composite material is configured to adopt the shape of a container.

15. A method of forming a hygromorphic composite material according to claim 1, the method comprising the steps of:

(a) providing a moisture-active pollen paper substrate having a top and a bottom surface, where the pollen paper substrate is formed from a plurality of pollen microgel particles; and (b) printing toner and/or ink in a pattern on the top and/or bottom surface of the moisture-active pollen paper substrate.

* * * * *